(12) United States Patent
Hersh et al.

(10) Patent No.: US 11,050,144 B1
(45) Date of Patent: Jun. 29, 2021

(54) ASSEMBLY WITH AT LEAST ONE ANTENNA AND A THERMAL INSULATION COMPONENT

(71) Applicant: W. L. Gore & Associates, Inc., Newark, DE (US)

(72) Inventors: Jacob B. Hersh, Newark, DE (US); John C. Allen, Newark, DE (US); Mitchell H. Warren, Newark, DE (US); Lindsey C. Keen, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 15 days.

(21) Appl. No.: 16/870,707

(22) Filed: May 8, 2020

(51) Int. Cl.
  *H01Q 1/40* (2006.01)
  *B01J 13/00* (2006.01)
  *H05K 5/02* (2006.01)

(52) U.S. Cl.
  CPC .......... *H01Q 1/405* (2013.01); *B01J 13/0091* (2013.01); *H05K 5/0213* (2013.01)

(58) Field of Classification Search
  CPC ....... H01Q 1/02; H01Q 1/405; B01J 13/0091; H05K 5/0213
  See application file for complete search history.

(56) References Cited

U.S. PATENT DOCUMENTS

| | | | | |
|---|---|---|---|---|
| 2,705,691 A | * | 4/1955 | Panagrossi | C08J 5/124 428/220 |
| 2,750,321 A | * | 6/1956 | Koppelman | H01Q 1/08 343/873 |
| 4,358,772 A | * | 11/1982 | Leggett | B32B 18/00 343/872 |
| 6,377,220 B1 | * | 4/2002 | Cook | H01Q 1/1207 343/711 |
| 8,067,478 B1 | * | 11/2011 | Meador | C08G 18/302 521/154 |
| 8,765,230 B1 | * | 7/2014 | Waldrop, III | H01Q 1/42 427/402 |
| 10,288,113 B2 | * | 5/2019 | Gorges | G01K 7/16 |
| 10,446,920 B1 | * | 10/2019 | Meador | H01Q 21/0087 |
| 2002/0094426 A1 | * | 7/2002 | Stepanian | C03C 13/00 428/292.1 |

(Continued)

FOREIGN PATENT DOCUMENTS

| | | |
|---|---|---|
| CN | 105256902 A | 1/2016 |
| CN | 105914463 A | 6/2016 |

(Continued)

*Primary Examiner* — Dimary S Lopez Cruz
*Assistant Examiner* — Bamidele A Jegede
(74) *Attorney, Agent, or Firm* — Greenberg Traurig LLP

(57) ABSTRACT

Some embodiments of the present disclosure relate to an assembly. In some embodiments the assembly comprises at least one antenna and a thermal insulation component. In some embodiments, the at least one antenna is configured to transmit a field of radiofrequency (RF) communication at an operating frequency ranging from 6 GHz to 100 GHz. In some embodiments, the thermal insulation component is disposed within the field of RF communication. In some embodiments, the thermal insulation component has a thermal conductivity ranging from 0.0025 W/m·K to 0.025 W/m·K at 25° C. and 1 atm.

22 Claims, 22 Drawing Sheets

(56) References Cited

U.S. PATENT DOCUMENTS

| | | | | |
|---|---|---|---|---|
| 2004/0227227 A1* | 11/2004 | Imanaka | | H01L 21/4857 |
| | | | | 257/700 |
| 2005/0100728 A1* | 5/2005 | Ristic-Lehmann | | C08K 3/36 |
| | | | | 428/323 |
| 2005/0231855 A1* | 10/2005 | Tran | | G11C 11/21 |
| | | | | 360/324.1 |
| 2005/0238872 A1* | 10/2005 | Kennedy | | B32B 27/322 |
| | | | | 428/336 |
| 2006/0083948 A1* | 4/2006 | Kawaguchi | | H01F 41/18 |
| | | | | 428/692.1 |
| 2007/0004306 A1 | 1/2007 | Lesser | | |
| 2007/0122960 A1* | 5/2007 | Aoki | | H01L 23/528 |
| | | | | 438/197 |
| 2007/0173157 A1 | 7/2007 | Trifu | | |
| 2008/0009125 A1* | 1/2008 | Yamazaki | | G06K 19/07783 |
| | | | | 438/464 |
| 2008/0224937 A1* | 9/2008 | Kimura | | H01F 1/344 |
| | | | | 343/787 |
| 2010/0229375 A1* | 9/2010 | Hwan | | H01L 23/66 |
| | | | | 29/601 |
| 2012/0238446 A1* | 9/2012 | Tsuchimura | | B41M 5/305 |
| | | | | 503/207 |
| 2012/0273577 A1* | 11/2012 | Kim | | G06K 19/07722 |
| | | | | 235/488 |
| 2014/0145891 A1* | 5/2014 | Palevsky | | H01Q 9/0435 |
| | | | | 343/746 |
| 2015/0364829 A1* | 12/2015 | Tong | | G01S 7/03 |
| | | | | 342/175 |
| 2017/0203552 A1* | 7/2017 | D'Arcy | | B32B 5/022 |
| 2017/0245380 A1 | 8/2017 | Yun et al. | | |
| 2017/0271745 A1* | 9/2017 | Yun | | H01Q 1/42 |
| 2017/0355829 A1* | 12/2017 | Sakaguchi | | B01J 13/0091 |
| 2017/0360505 A1* | 12/2017 | Ehninger | | H01Q 7/00 |
| 2018/0290118 A1* | 10/2018 | Sakaguchi | | B32B 5/22 |
| 2019/0263998 A1 | 8/2019 | Poe et al. | | |
| 2019/0322084 A1 | 10/2019 | Yoshida | | |

FOREIGN PATENT DOCUMENTS

| | | |
|---|---|---|
| CN | 106626676 A | 5/2017 |
| CN | 206501539 U | 9/2017 |
| CN | 109130405 A | 1/2019 |
| WO | 2018/200827 A1 | 11/2018 |

* cited by examiner

Series Impedance: $R_{m,1} = \dfrac{(\eta_0/\eta_m)}{2} \begin{bmatrix} 1 + \dfrac{\eta_m}{\eta_0} & -1 + \dfrac{\eta_m}{\eta_0} \\ -1 + \dfrac{\eta_m}{\eta_0} & 1 + \dfrac{\eta_m}{\eta_0} \end{bmatrix}$ Where $m$ is the number of layers Section of uniform waveguide: $R_{m,2} = \begin{bmatrix} e^{-\gamma_m t_m} & 0 \\ 0 & e^{\gamma_m t_m} \end{bmatrix}$ $R_{eq} = R_{1,1} * R_{1,2} * \cdots R_{m-1,1} * R_{m-2,2} * R_{m,1} = \begin{bmatrix} r_{11} & r_{12} \\ r_{21} & r_{22} \end{bmatrix}$ R matrices can be cascaded to obtain $R_{eq}$ $S = \dfrac{1}{r_{22}} \begin{bmatrix} r_{12} & (r_{11}r_{22} - r_{12}r_{21}) \\ 1 & -r_{21} \end{bmatrix} = \begin{bmatrix} s_{11} & s_{12} \\ s_{21} & s_{22} \end{bmatrix}$, where $s_{11} = s_{22}$ = Reflection Coefficient
$s_{21} = s_{12}$ = Transmission Coefficient Note : s and R parameters are complex (a+bj)

S (scattering) matrix is unitless, where $s_{21} \sim \dfrac{V_{Transmitted}}{V_{Reference}}$ Transmission Loss = $20 \log_{10}(\|s_{21}\|)$

Fig. 9 (cont..)

☐ RF Limit: Transmission Loss @ 28 GHz < 0.25dB
○ RF Limit: Transmission Loss @ 39 GHz < 0.25dB
△ Thermal Limit: Conductivity < 0.025 W/mK
✱ Thickness Limit: Component < 2mm ☐ RF Limit: Transmission Loss @ 28 GHz < 0.25dB
○ RF Limit: Transmission Loss @ 39 GHz < 0.25dB
△ Thermal Limit: Conductivity < 0.025 W/mK
✱ Thickness Limit: Component < 2mm

US 11,050,144 B1

ASSEMBLY WITH AT LEAST ONE ANTENNA AND A THERMAL INSULATION COMPONENT

FIELD

The present disclosure relates to the field of thermal insulation for an assembly that includes at least one antenna.

BACKGROUND

The 5th generation wireless technology, 5G, is facing many technical challenges in implementation. The challenges may specifically arise at higher frequency bandwidths. At certain high frequencies, including but not limited to those operating in the millimeter wave regime, radio frequencies may become susceptible to signal interruption. At the same time, touch and temperature guidelines (e.g., the UL62368-1 standard) may limit the surface temperature of a 5G wireless device to protect users from excessive heat generation from a 5G antenna on the wireless device. Assemblies that include materials that not only minimize signal interruption, but also control the surface temperature of a 5G wireless device are needed.

SUMMARY

Some embodiments of the present disclosure relate to an assembly comprising:
  at least one antenna,
    wherein the at least one antenna is configured to transmit a field of radiofrequency (RF) communication at an operating frequency ranging from 6 GHz to 100 GHz; and
  a thermal insulation component,
    wherein the thermal insulation component is disposed within the field of RF communication, and
    wherein the thermal insulation component has a thermal conductivity of 0.0025 W/m·K to 0.025 W/m·K at 25° C. and 1 atm.

Some embodiments of the present disclosure relate to a method of using an assembly, the method comprising:
  obtaining the assembly, wherein the assembly comprises:
    at least one antenna; and
    a thermal insulation component,
      wherein the thermal insulation component is disposed within the field of RF communication, and
      wherein the thermal insulation component has a thermal conductivity of 0.0025 W/m·K to 0.025 W/m·K at 25° C. and 1 atm;
  transmitting a field of a radiofrequency (RF) communication from the at least one antenna at an operating frequency ranging from 6 GHz to 100 GHz,
    wherein the field of RF communication is transmitted such that the thermal insulation component is disposed in the field of RF communication.

Some embodiments of the present disclosure relate to a method of making an assembly, the method comprising:
  obtaining at least one antenna;
    wherein the at least one antenna of is configured to transmit a field of radiofrequency (RF) communication at an operating frequency ranging from 6 GHz to 100 GHz; and
  placing a thermal insulation component on at least one surface of the at least one antenna, so as to form an assembly;
    wherein placing the thermal insulation component on at least one surface of the antenna array disposes the thermal insulation component within the field of RF communication, and
    wherein the thermal insulation component has a thermal conductivity of 0.0025 W/m·K to 0.025 W/m·K at 25° C. and 1 atm.

Some embodiments of the present disclosure relate to an assembly comprising: at least one antenna,
  wherein the at least one antenna is configured to transmit a field of radiofrequency (RF) communication at an operating frequency ranging from 6 GHz to 100 GHz; and
  a thermal insulation component,
    wherein the thermal insulation component is disposed within the field of RF communication, and
    wherein the thermal insulation component has a thermal conductivity ranging from 0.0025 W/m·K to 0.025 W/m·K at 25° C. and 1 atm,
    wherein the thermal insulation component has a has a dielectric constant ranging from 1.05 to 4 measured in accordance with IEC 61189-2-721 Edition 1 2015-04 at 10 GHz using a Split Post Dielectric Resonator (SPDR), and
    wherein the thermal insulation component has a loss tangent ranging from 0.00001 to 0.1 measured in accordance with IEC 61189-2-721 Edition 1 2015-04 at 10 GHz using the SPDR.

Some embodiments of the present disclosure relate to an assembly comprising: at least one antenna,
  wherein the at least one antenna is configured to transmit a field of radiofrequency (RF) communication at an operating frequency ranging from 6 GHz to 100 GHz; and
  a thermal insulation component,
    wherein the thermal insulation component is disposed within the field of RF communication,
    wherein the thermal insulation component has a thickness of 0.03 mm to 2 mm, and
    wherein the thermal insulation component comprises an aerogel in an amount of 30 wt % to 95 wt % based on a total weight of the thermal insulation component.

Some embodiments of the present disclosure relate to an assembly comprising:
  an antenna array,
    wherein the antenna array is configured to transmit a field of radiofrequency (RF) communication at an operating frequency ranging from 6 GHz to 100 GHz; and
  a thermal insulation component,
    wherein the thermal insulation component is disposed within the field of RF communication, and
    wherein the thermal insulation component comprises:
      a protective film;
      at least one thermal insulation layer,
        wherein the at least one thermal insulation layer is disposed between the protective film and the at least one adhesive layer;
        wherein the at least one thermal insulation layer defines 50% to 99% of a total thickness of the thermal insulation component;
      at least one adhesive layer,
        wherein the at least one adhesive layer is disposed between the antenna array and the thermal insulation layer of the thermal insulation component.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DRAWINGS

Figure 1:
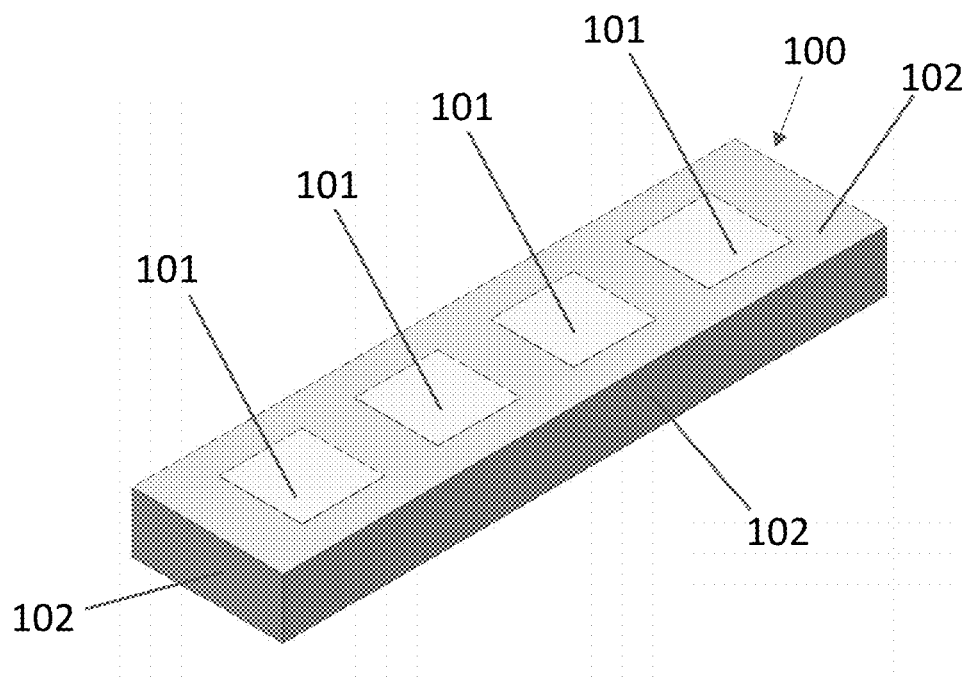
FIG. 1 depicts a non-limiting example of an array according to the present disclosure.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

As used herein "an antenna" is any device configured to transmit a field of radiofrequency (RF) communication.

As used herein, "thermal conductivity" is a measure of a material's ability to conduct heat. "Thermal conductivity" can be calculated using Fourier's law. In some non-limiting embodiments, thermal conductivity of a component comprising multiple layers (such as but not limited to a thermal insulation component described herein) can also be calculated using the following equation:

$$k_{eq} = \frac{t_{eq}}{\frac{t_1}{k_1} + \frac{t_2}{k_2} + \ldots \frac{t_n}{k_n}};$$

where $k_{eq}$ is the thermal conductivity of the multi-layered component, where $t_{eq}$ is a total thickness of the component, where $t_1, t_2, \ldots t_n$ are respective thicknesses of each individual layer, and where, $k_1, k_2, \ldots k_n$ are respective thermal conductivities of each individual layer.

As used herein, a "thermal insulation component" is any component of an assembly described herein that has a thermal conductivity disclosed herein (such, as but not limited to, a thermal conductivity of less than 0.025 W/m·K at 25° C. and 1 atm).

As used herein a "thermal insulation layer" is a layer of a thermal insulation component described herein that has a thermal conductivity disclosed herein (such, as but not limited to, a thermal conductivity of less than 0.025 W/m·K at 25° C. and 1 atm).

As used herein "an aerogel" is a solid material comprising at least one gas (e.g., air) as a dispersed interstitial medium within a structural (e.g., microstructural) framework of the solid material.

As used herein a "reinforced aerogel" is an aerogel that comprises at least one reinforcement material. Several non-limiting examples of reinforced aerogels and reinforcement materials are disclosed herein, infra.

As used herein, "dielectric constant" is a dimensionless quantity that measures the permittivity of a given material. In some embodiments, "dielectric constant" can be calculated as a ratio of a measured permittivity (i.e., due to passage of an electromagnetic wave through given material) over a reference permittivity (i.e., due to the passage of the same electromagnetic wave through a reference material such as a vacuum). As used herein, dielectric constant is measured in accordance with IEC 61189-2-721 Edition 1 2015-04 at 10 GHz using a Split Post Dielectric Resonator (SPDR). A non-limiting procedure for measuring dielectric constant is provided herein in the "Examples" section, infra.

As used herein, "loss tangent" is a dimensionless quantity that measures the ability of a given material to dissipate or "lose" electromagnetic energy (e.g. in the form of heat, frictional losses, and static losses). As used herein, loss tangent is measured in accordance with IEC 61189-2-721 Edition 12015-04 at 10 GHz using a Split Post Dielectric Resonator (SPDR). A non-limiting procedure for measuring loss tangent is provided herein in the "Examples" section, infra.

As used herein, the term "bonded" refers to any mechanism by which a plurality of materials is attached together. Examples of suitable bonding mechanisms include, but are not limited to, heat bonding, laser bonding, mechanical attachment, at least one adhesive, or any combination thereof.

As used herein the term "clad" refers to a configuration of a structure wherein dissimilar components (e.g., a membrane and an aerogel) of the structure are bonded together.

Some embodiments of the present disclosure relate to an assembly. In some embodiments the assembly comprises at least one antenna and a thermal insulation component.

Regarding the at least one antenna, in some embodiments, the at least one antenna is configured to transmit a field of radiofrequency (RF) communication at an operating frequency ranging from 6 GHz to 100 GHz. In some embodiments, the at least one antenna is configured to transmit a field of RF communication at an operating frequency ranging from 10 GHz to 100 GHz. In some embodiments, the at least one antenna is configured to transmit a field of RF communication at an operating frequency ranging from 20 GHz to 100 GHz. In some embodiments, the at least one antenna is configured to transmit a field of RF communication at an operating frequency ranging from 30 GHz to 100 GHz. In some embodiments, the at least one antenna is configured to transmit a field of RF communication at an operating frequency ranging from 40 GHz to 100 GHz. In some embodiments, the at least one antenna is configured to transmit a field of RF communication at an operating frequency ranging from 50 GHz to 100 GHz. In some embodiments, the at least one antenna is configured to transmit a field of RF communication at an operating frequency ranging from 60 GHz to 100 GHz. In some embodiments, the at least one antenna is configured to transmit a field of RF communication at an operating frequency ranging from 70 GHz to 100 GHz. In some embodiments, the at least one antenna is configured to transmit a field of RF communication at an operating frequency ranging from 80 GHz to 100 GHz. In some embodiments, the at least one antenna is configured to transmit a field of RF communication at an operating frequency ranging from 90 GHz to 100 GHz.

In some embodiments, the at least one antenna is configured to transmit a field of RF communication at an operating frequency ranging from 6 GHz to 90 GHz. In some embodiments, the at least one antenna is configured to transmit a field of RF communication at an operating frequency ranging from 6 GHz to 80 GHz. In some embodiments, the at least one antenna is configured to transmit a field of RF communication at an operating frequency ranging from 6 GHz to 70 GHz. In some embodiments, the at least one antenna is configured to transmit a field of RF communication at an operating frequency ranging from 6 GHz to 60 GHz. In some embodiments, the at least one antenna is configured to transmit a field of RF communication at an operating frequency ranging from 6 GHz to 50 GHz. In some embodiments, the at least one antenna is configured to transmit a field of RF communication at an operating frequency ranging from 6 GHz to 40 GHz. In some embodiments, the at least one antenna is configured to transmit a field of RF communication at an operating frequency ranging from 6 GHz to 30 GHz. In some embodiments, the at least one antenna is configured to transmit a field of RF communication at an operating frequency ranging from 6 GHz to 20 GHz. In some embodiments, the at least one antenna is configured to transmit a field of RF communication at an operating frequency ranging from 6 GHz to 10 GHz.

In some embodiments, the at least one antenna is configured to transmit a field of RF communication at an operating frequency ranging from 10 GHz to 90 GHz. In some embodiments, the at least one antenna is configured to transmit a field of RF communication at an operating frequency ranging from 20 GHz to 80 GHz. In some embodiments, the at least one antenna is configured to transmit a field of RF communication at an operating frequency ranging from 30 GHz to 70 GHz. In some embodiments, the at least one antenna is configured to transmit a field of RF communication at an operating frequency ranging from 40 GHz to 60 GHz.

In some embodiments, the at least one antenna is configured to transmit a field of radiofrequency (RF) communication at a wavelength ranging from 3 mm to 50 mm. In some embodiments, the at least one antenna is configured to transmit a field of RF communication at a wavelength ranging from 10 mm to 50 mm. In some embodiments, the at least one antenna is configured to transmit a field of RF communication at a wavelength ranging from 20 mm to 50 mm. In some embodiments, the at least one antenna is configured to transmit a field of RF communication at a wavelength ranging from 30 mm to 50 mm. In some embodiments, the at least one antenna is configured to transmit a field of RF communication at a wavelength ranging from 40 mm to 50 mm.

In some embodiments, the at least one antenna is configured to transmit a field of RF communication at a wavelength ranging from 3 mm to 40 mm. In some embodiments, the at least one antenna is configured to transmit a field of RF communication at a wavelength ranging from 3 mm to 30 mm. In some embodiments, the at least one antenna is configured to transmit a field of RF communication at a wavelength ranging from 3 mm to 20 mm. In some embodiments, the at least one antenna is configured to transmit a field of RF communication at a wavelength ranging from 3 mm to 10 mm.

In some embodiments, the at least one antenna is configured to transmit a field of RF communication at a wavelength ranging from 10 mm to 40 mm. In some embodiments, the at least one antenna is configured to transmit a field of RF communication at a wavelength ranging from 20 mm to 30 mm.

In some embodiments, the at least one antenna may be in the form of an antenna array. In some embodiments, the antenna array is configured to transmit a field of RF communication at any operating frequency disclosed herein, any wavelength disclosed herein, or any combination thereof. In some embodiments, the antenna array may comprise a plurality of antennas. In some embodiments, each antenna of the plurality of antennas is configured to transmit a field of RF communication at any operating frequency disclosed herein, any wavelength disclosed herein, or any combination thereof.

In some embodiments, the antenna array comprises a plurality of planes, for example, by having the form of a shape that has a plurality of planes. Without being limiting, the antenna array could take the form of a cube, a triangular prism, a rectangular prism, or any polyhedron.

A non-limiting example an antenna array is shown in FIG. 1. As shown, exemplary antenna array 100 may comprise a plurality of antennas 101. In some non-limiting embodiments, antenna array 100 may be shaped as a rectangular prism having a plurality of planes 102.

In some embodiments, the antenna array may comprise at least 2 antennas. In some embodiments, the antenna array may comprise at least 3 antennas. In some embodiments, the antenna array may comprise at least 4 antennas. In some embodiments, the antenna array may comprise at least 5 antennas. In some embodiments, the antenna array may comprise at least 10 antennas. In some embodiments, the antenna array may comprise at least 16 antennas. In some embodiments, the antenna array may comprise at least 25 antennas. In some embodiments, the antenna array may comprise at least 50 antennas. In some embodiments, the antenna array may comprise at least 75 antennas. In some embodiments, the antenna array may comprise at least 100 antennas.

In some embodiments, the antenna array may comprise 2 to 100 antennas. In some embodiments, the antenna array may comprise 3 to 100 antennas. In some embodiments, the antenna array may comprise 4 to 100 antennas. In some embodiments, the antenna array may comprise 5 to 100 antennas. In some embodiments, the antenna array may comprise 10 to 100 antennas. In some embodiments, the antenna array may comprise 16 to 100 antennas. In some embodiments, the antenna array may comprise 25 to 100 antennas. In some embodiments, the antenna array may comprise 50 to 100 antennas. In some embodiments, the antenna array may comprise 75 to 100 antennas.

In some embodiments, the antenna array may comprise 2 to 75 antennas. In some embodiments, the antenna array may comprise 2 to 50 antennas. In some embodiments, the antenna array may comprise 2 to 25 antennas. In some embodiments, the antenna array may comprise 2 to 16 antennas. In some embodiments, the antenna array may comprise 2 to 10 antennas. In some embodiments, the antenna array may comprise 2 to 5 antennas. In some embodiments, the antenna array may comprise 2 to 4 antennas. In some embodiments, the antenna array may comprise 2 to 3 antennas.

In some embodiments, the antenna array may comprise 3 to 75 antennas. In some embodiments, the antenna array may comprise 4 to 50 antennas. In some embodiments, the antenna array may comprise 5 to 25 antennas. In some embodiments, the antenna array may comprise 10 to 16 antennas.

In some embodiments, the antenna array comprises 4 to 8 planes. In some embodiments, the antenna array comprises 5 to 8 planes. In some embodiments, the antenna array comprises 6 to 8 planes. In some embodiments, the antenna array comprises 7 to 8 planes.

In some embodiments, the antenna array comprises 4 to 7 planes. In some embodiments, the antenna array comprises 4 to 6 planes. In some embodiments, the antenna array comprises 4 to 5 planes.

In some embodiments, the antenna array comprises 5 to 7 planes. In some embodiments, the antenna array comprises 5 to 6 planes.

Figure 2:
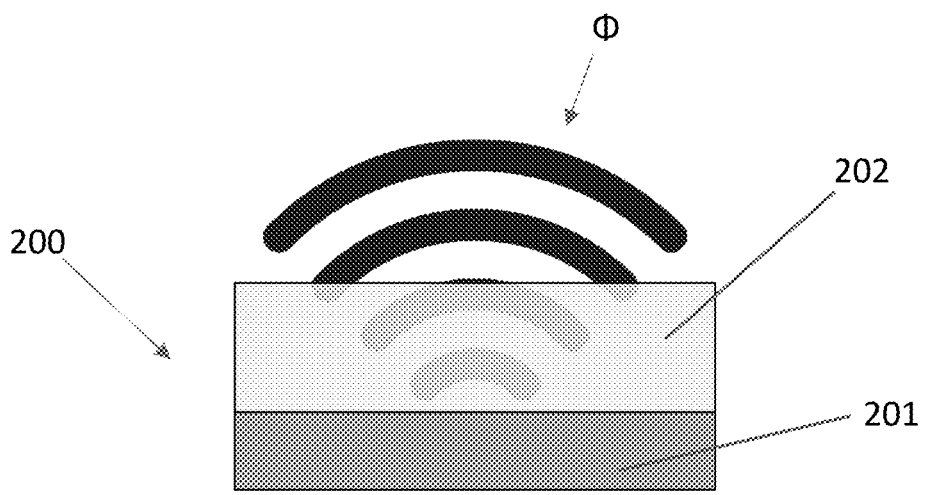
FIG. 2 depicts a non-limiting example of a thermal insulation component disposed within a field of radiofrequency (RF) communication.

Moving on to the thermal insulation component, in some embodiments, the thermal insulation component may be disposed within the field of RF communication generated by the at least one antenna. A non-limiting example of an assembly where the thermal insulation component is disposed within the field of RF communication is shown in FIG. 2. As shown, assembly 200 may include a thermal insulation component 202, which may be disposed within a field ($\Phi$) of RF communication generated by at least one antenna 201.

In some embodiments, a portion of the thermal insulation component extends beyond the field of RF communication. In some embodiments, 10% of the thermal insulation component extends beyond the field of RF communication. In some embodiments, 20% of the thermal insulation component extends beyond the field of RF communication. In some embodiments, 30% of the thermal insulation component extends beyond the field of RF communication. In some embodiments, 40% of the thermal insulation component extends beyond the field of RF communication. In some embodiments, 50% of the thermal insulation component extends beyond the field of RF communication. In some embodiments, 60% of the thermal insulation component extends beyond the field of RF communication. In some embodiments, 70% of the thermal insulation component extends beyond the field of RF communication. In some embodiments, 80% of the thermal insulation component extends beyond the field of RF communication. In some embodiments, 90% of the thermal insulation component extends beyond the field of RF communication.

In some embodiments, the thermal insulation component comprises a thermal insulation layer. In some embodiments, the thermal insulation component consists of the thermal insulation layer. In some embodiments, the thermal insulation component is embedded into the antenna array.

In some embodiments, the thermal insulation component, the thermal insulation layer, or any combination thereof has a thermal conductivity of less than 0.025 W/m·K at 25° C. and 1 atm. In some embodiments, the thermal insulation component, the thermal insulation layer, or any combination thereof has a thermal conductivity of less than 0.02 W/m·K at 25° C. and 1 atm. In some embodiments, the thermal insulation component, the thermal insulation layer, or any combination thereof has a thermal conductivity of less than 0.01 W/m·K at 25° C. and 1 atm. In some embodiments, the thermal insulation component, the thermal insulation layer, or any combination thereof has a thermal conductivity of less than 0.005 W/m·K at 25° C. and 1 atm. In some embodiments, the thermal insulation component, the thermal insulation layer, or any combination thereof has a thermal conductivity of less than 0.0025 W/m·K at 25° C. and 1 atm.

In some embodiments, the thermal insulation component, the thermal insulation layer, or any combination thereof has a thermal conductivity ranging from 0.0025 W/m·K to 0.025 W/m·K at 25° C. and 1 atm. In some embodiments, the thermal insulation component, the thermal insulation layer, or any combination thereof has a thermal conductivity ranging from 0.005 W/m·K to 0.025 W/m·K at 25° C. and 1 atm. In some embodiments, the thermal insulation component, the thermal insulation layer, or any combination thereof has a thermal conductivity ranging from 0.01 W/m·K to 0.025 W/m·K at 25° C. and 1 atm. In some embodiments, the thermal insulation component, the thermal insulation layer, or any combination thereof has a thermal conductivity ranging from 0.02 W/m·K to 0.025 W/m·K at 25° C. and 1 atm.

In some embodiments, the thermal insulation component, the thermal insulation layer, or any combination thereof has a thermal conductivity ranging from 0.0025 W/m·K to 0.02 W/m·K at 25° C. and 1 atm. In some embodiments, the thermal insulation component, the thermal insulation layer, or any combination thereof has a thermal conductivity ranging from 0.0025 W/m·K to 0.01 W/m·K at 25° C. and 1 atm. In some embodiments, the thermal insulation component, the thermal insulation layer, or any combination thereof has a thermal conductivity ranging from 0.0025 W/m·K to 0.005 W/m·K at 25° C. and 1 atm.

In some embodiments, the thermal insulation component, the thermal insulation layer, or any combination thereof has a thermal conductivity ranging from 0.005 W/m·K to 0.02 W/m·K at 25° C. and 1 atm. In some embodiments, the thermal insulation component, the thermal insulation layer, or any combination thereof has a thermal conductivity ranging from 0.005 W/m·K to 0.01 W/m·K at 25° C. and 1 atm. In some embodiments, the thermal insulation component, the thermal insulation layer, or any combination thereof has a thermal conductivity ranging from 0.01 W/m·K to 0.02 W/m·K at 25° C. and 1 atm.

In some embodiments, the thermal insulation component, the thermal insulation layer, or any combination thereof has a dielectric constant ranging from 1.05 to 4 measured in accordance with IEC 61189-2-721 Edition 1 2015-04 at 10 GHz using a Split Post Dielectric Resonator (SPDR). In some embodiments, the thermal insulation component, the thermal insulation layer, or any combination thereof has a dielectric constant ranging from 1.5 to 4 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 2 to 4 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 2.5 to 4 measured in accordance with IEC 61189-2-721 Edition 12015-04 at 10 GHz using a SPDR. In some embodiments, the thermal insulation component, the thermal insulation layer, or any combination thereof has a dielectric constant ranging from 3 to 4 measured in accordance with IEC 61189-2-721 Edition 12015-04 at 10 GHz using a SPDR. In some embodiments, the thermal insulation component, the thermal insulation layer, or any combination thereof has a dielectric constant ranging from 3.5 to 4 measured in accordance with IEC 61189-2-721 Edition 12015-04 at 10 GHz using a SPDR.

In some embodiments, the thermal insulation component, the thermal insulation layer, or any combination thereof has a dielectric constant ranging from 1.05 to 3.5 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 1.05 to 3 measured in accordance with IEC 61189-2-721 Edition 12015-04 at 10 GHz using a SPDR. In some embodiments, the thermal insulation component, the thermal insulation layer, or any combination thereof has a dielectric constant ranging from 1.05 to 2.5 measured in accordance with IEC 61189-2-721 Edition 12015-04 at 10 GHz using a SPDR. In some embodiments, the thermal insulation component, the thermal insulation layer, or any combination thereof has a dielectric constant ranging from 1.05 to 2 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 1.05 to 1.5 measured in accordance with IEC 61189-2-721 Edition 12015-04 at 10 GHz using a SPDR.

In some embodiments, the thermal insulation component, the thermal insulation layer, or any combination thereof has a dielectric constant ranging from 1.1 to 4 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 1.2 to 4 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 1.1 to 1.5 measured in accordance with IEC 61189-2-721 Edition 12015-04 at 10 GHz using a SPDR.

In some embodiments, the thermal insulation component, the thermal insulation layer, or any combination thereof has a dielectric constant ranging from 1.5 to 3.5 measured in accordance with IEC 61189-2-721 Edition 1 2015-04 at 10 GHz using a SPDR. In some embodiments, the thermal insulation component, the thermal insulation layer, or any combination thereof has a dielectric constant ranging from 2 to 2.5 measured in accordance with IEC 61189-2-721 Edition 12015-04 at 10 GHz using a SPDR.

In some embodiments, the thermal insulation component, the thermal insulation layer, or any combination thereof has a loss tangent ranging from 0.00001 to 0.1 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.0001 to 0.1 measured in accordance with IEC 61189-2-721 Edition 12015-04 at 10 GHz using a SPDR. In some embodiments, the thermal insulation component, the thermal insulation layer, or any combination thereof has a loss tangent ranging from 0.001 to 0.1 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.01 to 0.1 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.05 to 0.1 measured in accordance with IEC 61189-2-721 Edition 1 2015-04 at 10 GHz using a SPDR.

In some embodiments, the thermal insulation component, the thermal insulation layer, or any combination thereof has a loss tangent ranging from 0.00001 to 0.05 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.00001 to 0.01 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.00001 to 0.001 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.00001 to 0.0001 measured in accordance with IEC 61189-2-721 Edition 12015-04 at 10 GHz using a SPDR.

In some embodiments, the thermal insulation component, the thermal insulation layer, or any combination thereof has a loss tangent ranging from 0.0001 to 0.05 measured in accordance with IEC 61189-2-721 Edition 1 2015-04 at 10 GHz using a SPDR. In some embodiments, the thermal insulation component, the thermal insulation layer, or any combination thereof has a loss tangent ranging from 0.001 to 0.01 measured in accordance with IEC 61189-2-721 Edition 12015-04 at 10 GHz using a SPDR. In some embodiments, the thermal insulation component, the thermal insulation layer, or any combination thereof has a loss tangent ranging from 0.005 to 0.1 measured in accordance with IEC 61189-2-721 Edition 12015-04 at 10 GHz using a SPDR.

In some embodiments, the thermal insulation component, the thermal insulation layer, or any combination thereof, attenuates a transmitted RF signal by less than 1 dB measured relative to air. In some embodiments, the thermal insulation component, the thermal insulation layer, or any combination thereof, attenuates a transmitted RF signal by less than 0.75 dB measured relative to air. In some embodiments, the thermal insulation component, the thermal insulation layer, or any combination thereof, attenuates a transmitted RF signal by less than 0.5 dB measured relative to air. In some embodiments, the thermal insulation component, the thermal insulation layer, or any combination thereof, attenuates a transmitted RF signal by less than 0.25 dB measured relative to air.

In some embodiments, the thermal insulation component, the thermal insulation layer, or any combination thereof, attenuates a transmitted RF signal by 0.001 dB to 1 dB measured relative to air. In some embodiments, the thermal insulation component, the thermal insulation layer, or any combination thereof, attenuates a transmitted RF signal by 0.01 dB to 1 dB measured relative to air. In some embodiments, the thermal insulation component, the thermal insulation layer, or any combination thereof, attenuates a transmitted RF signal by 0.1 dB to 1 dB measured relative to air. In some embodiments, the thermal insulation component, the thermal insulation layer, or any combination thereof, attenuates a transmitted RF signal by 0.25 dB to 1 dB measured relative to air. In some embodiments, the thermal insulation component, the thermal insulation layer, or any combination thereof, attenuates a transmitted RF signal by 0.5 dB to 1 dB measured relative to air. In some embodiments, the thermal insulation component, the thermal insulation layer, or any combination thereof, attenuates a transmitted RF signal by 0.75 dB to 1 dB measured relative to air.

In some embodiments, the thermal insulation component, the thermal insulation layer, or any combination thereof, attenuates a transmitted RF signal by 0.001 dB to 0.75 dB measured relative to air. In some embodiments, the thermal insulation component, the thermal insulation layer, or any combination thereof, attenuates a transmitted RF signal by 0.001 dB to 0.5 dB measured relative to air. In some embodiments, the thermal insulation component, the thermal insulation layer, or any combination thereof, attenuates a transmitted RF signal by 0.001 dB to 0.25 dB measured relative to air. In some embodiments, the thermal insulation component, the thermal insulation layer, or any combination thereof, attenuates a transmitted RF signal by 0.001 dB to 0.1 dB measured relative to air. In some embodiments, the thermal insulation component, the thermal insulation layer, or any combination thereof, attenuates a transmitted RF signal by 0.001 dB to 0.01 dB measured relative to air.

In some embodiments, the thermal insulation component, the thermal insulation layer, or any combination thereof, attenuates a transmitted RF signal by 0.01 dB to 0.75 dB measured relative to air. In some embodiments, the thermal insulation component, the thermal insulation layer, or any combination thereof, attenuates a transmitted RF signal by 0.1 dB to 0.5 dB measured relative to air.

In some embodiments, the thermal insulation layer, the thermal insulation component, or any combination thereof comprises an aerogel. In some embodiments, the thermal insulation layer, the thermal insulation component, or any combination thereof comprises the aerogel in an amount of at least 30 wt % based on a total weight of the thermal insulation layer, the thermal insulation component, or any combination thereof. In some embodiments, the thermal insulation layer, the thermal insulation component, or any combination thereof comprises the aerogel in an amount of at least 40 wt % based on a total weight of the thermal insulation layer, the thermal insulation component, or any combination thereof. In some embodiments, the thermal insulation layer, the thermal insulation component, or any combination thereof comprises the aerogel in an amount of at least 50 wt % based on a total weight of the thermal insulation layer, the thermal insulation component, or any combination thereof. In some embodiments, the thermal insulation layer, the thermal insulation component, or any combination thereof comprises the aerogel in an amount of at least 60 wt % based on a total weight of the thermal insulation layer, the thermal insulation component, or any combination thereof. In some embodiments, the thermal insulation layer, the thermal insulation component, or any combination thereof comprises the aerogel in an amount of at least 70 wt % based on a total weight of the thermal insulation layer, the thermal insulation component, or any combination thereof. In some embodiments, the thermal insulation layer, the thermal insulation component, or any combination thereof comprises the aerogel in an amount of at least 80 wt % based on a total weight of the thermal insulation layer, the thermal insulation component, or any combination thereof. In some embodiments, the thermal insulation layer, the thermal insulation component, or any combination thereof comprises the aerogel in an amount of at least 90 wt % based on a total weight of the thermal insulation layer, the thermal insulation component, or any combination thereof. In some embodiments, the thermal insulation layer, the thermal insulation component, or any combination thereof comprises the aerogel in an amount of at least 95 wt % based on a total weight of the thermal insulation layer, the thermal insulation component, or any combination thereof.

In some embodiments, the thermal insulation layer, the thermal insulation component, or any combination thereof comprises the aerogel in an amount of 30 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 40 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 50 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 60 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 70 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 80 wt % to 95 wt % based on a total weight of the thermal insulation layer, the thermal insulation component, or any combination thereof. In some embodiments, the thermal insulation layer, the thermal insulation component, or any combination thereof comprises the aerogel in an amount of 90 wt % to 95 wt % based on a total weight of the thermal insulation layer, the thermal insulation component, or any combination thereof.

In some embodiments, the thermal insulation layer, the thermal insulation component, or any combination thereof comprises the aerogel in an amount of 30 wt % to 90 wt % based on a total weight of the thermal insulation layer, the thermal insulation component, or any combination thereof. In some embodiments, the thermal insulation layer, the thermal insulation component, or any combination thereof comprises the aerogel in an amount of 30 wt % to 80 wt % based on a total weight of the thermal insulation layer, the thermal insulation component, or any combination thereof. In some embodiments, the thermal insulation layer, the thermal insulation component, or any combination thereof comprises the aerogel in an amount of 30 wt % to 70 wt % based on a total weight of the thermal insulation layer, the thermal insulation component, or any combination thereof. In some embodiments, the thermal insulation layer, the thermal insulation component, or any combination thereof comprises the aerogel in an amount of 30 wt % to 60 wt % based on a total weight of the thermal insulation layer, the thermal insulation component, or any combination thereof. In some embodiments, the thermal insulation layer, the thermal insulation component, or any combination thereof comprises the aerogel in an amount of 30 wt % to 50 wt % based on a total weight of the thermal insulation layer, the thermal insulation component, or any combination thereof. In some embodiments, the thermal insulation layer, the thermal insulation component, or any combination thereof comprises the aerogel in an amount of 30 wt % to 40 wt % based on a total weight of the thermal insulation layer, the thermal insulation component, or any combination thereof. In some embodiments, the thermal insulation layer, the thermal insulation component, or any combination thereof comprises the aerogel in an amount of 40 wt % to 90 wt % based on a total weight of the thermal insulation layer, the thermal insulation component, or any combination thereof. In some embodiments, the thermal insulation layer, the thermal insulation component, or any combination thereof comprises the aerogel in an amount of 50 wt % to 80 wt % based on a total weight of the thermal insulation layer, the thermal insulation component, or any combination thereof. In some embodiments, the thermal insulation layer, the thermal insulation component, or any combination thereof comprises the aerogel in an amount of 60 wt % to 70 wt % based on a total weight of the thermal insulation layer, the thermal insulation component, or any combination thereof.

In some embodiments, the thermal insulation component has a thickness of 0.03 mm to 2 mm. In some embodiments, the thermal insulation component has a thickness of 0.05 mm to 2 mm. In some embodiments, the thermal insulation component has a thickness of 0.1 mm to 2 mm. In some embodiments, the thermal insulation component has a thickness of 0.5 mm to 2 mm. In some embodiments, the thermal insulation component has a thickness of 1 mm to 2 mm. In some embodiments, the thermal insulation component has a thickness of 1.5 mm to 2 mm.

In some embodiments, the thermal insulation component has a thickness of 0.03 mm to 1.5 mm. In some embodiments, the thermal insulation component has a thickness of 0.03 mm to 1 mm. In some embodiments, the thermal insulation component has a thickness of 0.03 mm to 0.5 mm. In some embodiments, the thermal insulation component has a thickness of 0.03 mm to 0.1 mm. In some embodiments, the thermal insulation component has a thickness of 0.03 mm to 0.05 mm.

In some embodiments, the thermal insulation component has a thickness of 0.05 mm to 1.5 mm. In some embodiments, the thermal insulation component has a thickness of 0.1 mm to 1 mm.

In some embodiments, the thermal insulation layer comprises an aerogel. In some embodiments, the aerogel is a ceramic aerogel, a polymer aerogel, or any combination thereof.

In some embodiments, the ceramic aerogel is a silica aerogel.

In some embodiments, the polymer aerogel is rendered hydrophobic. In some embodiments, hydrophobic treatment of the polymer aerogel minimizes absorption of water, adsorption of water, or any combination thereof, so as to reduce water's adverse effect on RF transmission. In some embodiments, the polymer aerogel is treated with 2, 2-Bis [4-(4-aminophenoxy) phenyl] propane ("BAPP") to render the polymer aerogel hydrophobic. In some embodiments, the polymer aerogel is rendered hydrophobic through at least one treatment described in Chinese Patent Application Publication No. CN109734954A to Hu et al, which is incorporated by reference herein in its entirety.

In some embodiments, the polymer aerogel is a polyimide aerogel. In some embodiments, the polymer aerogel is a polyamide aerogel.

In some embodiments, the aerogel is a reinforced aerogel. In some embodiments, the reinforced aerogel is a polymer reinforced aerogel. In some embodiments, the polymer reinforced aerogel is a silica aerogel comprising at least one polymer as a reinforcement material. In some embodiments, the polymer reinforced aerogel is a polyimide aerogel comprising at least one polymer as a reinforcement material.

In some embodiments, the polymer reinforced aerogel is a polyethylene terephthalate (PET) reinforced aerogel. In some embodiments, the PET reinforced aerogel is a silica aerogel comprising PET as a reinforcement material. In some embodiments, the PET reinforced aerogel is a polyimide aerogel comprising PET as a reinforcement material. In some embodiments, the PET reinforced aerogel can take the form of a PET non-woven textile reinforced aerogel.

In some embodiments, the polymer reinforced aerogel is a polytetrafluoroethylene (PTFE) reinforced aerogel. In some embodiments, the PTFE reinforced aerogel is a silica aerogel comprising PTFE as a reinforcement material. A non-limiting example of a silica aerogel comprising PTFE as a reinforcement material is described in of U.S. Pat. No. 7,118,801 to Ristic-Lehmann et al, which is incorporated by reference herein in entirety. In some embodiments, the PTFE reinforced aerogel is a polyimide aerogel comprising PTFE as a reinforcement material. In some embodiments, the PTFE reinforced aerogel can take the form of a PTFE membrane reinforced aerogel or a PTFE nanofiber web reinforced aerogel.

In some embodiments, the PTFE reinforced aerogel is a PTFE reinforced aerogel in a clad configuration, wherein the clad configuration further comprises a plurality of expanded polytetrafluoroethylene (ePTFE) layers, wherein each of the plurality of ePTFE layers is bonded to a surface of the PTFE reinforced aerogel.

In some embodiments, the polymer reinforced aerogel comprises a polymer reinforcement material chosen from: ePTFE, polyimide, polyamide, polypropylene, polyvinylidene difluoride (PVDF), polyethylene or any combination thereof.

In some embodiments, the aerogel is a ceramic reinforced aerogel. In some embodiments, the ceramic reinforced aerogel comprises fiberglass as a reinforcement material.

In some embodiments, the aerogel is a membrane reinforced aerogel. In some embodiments the membrane of the membrane reinforced aerogel is an ePTFE membrane, a polyethylene membrane, or any combination thereof.

In some embodiments, the aerogel is a nanofiber reinforced aerogel. In some embodiments, the nanofiber reinforced aerogel is reinforced with a polyimide nanofiber web, a polyamide nanofiber web, a polypropylene nanofiber web, a PVDF nanofiber web, a fiberglass nanofiber web, a PET nanofiber web, or any combination thereof.

In some embodiments, the aerogel is a textile reinforced aerogel. In some embodiments, the textile reinforced aerogel is a woven textile reinforced aerogel. In some embodiments, the textile reinforced aerogel is a non-woven textile reinforced aerogel. In some embodiments, the textile aerogel is a cloth reinforced aerogel. In some embodiments, the aerogel is a felt reinforced aerogel.

In some embodiments the woven textile of the woven textile reinforced aerogel is a PET woven textile, a polypropylene woven textile, a polyamide woven textile, or any combination thereof.

In some embodiments, the non-woven textile of the non-woven textile reinforced aerogel is a polypropylene non-woven textile, a polyamide non-woven textile, or any combination thereof.

In some embodiments, the cloth reinforced aerogel comprises fiberglass cloth, cotton cloth, or any combination thereof.

In some embodiments, the felt reinforced aerogel comprises fiberglass felt, cotton felt, or any combination thereof.

In some embodiments, the aerogel is a carrier film reinforced aerogel. In some embodiments, the carrier film is a polypropylene carrier film, a PET carrier film, or any combination thereof.

In some embodiments, the thermal insulation layer, the thermal insulation component, or any combination thereof, comprises a fluoropolymer. In some embodiments, the fluoropolymer is PTFE. In some embodiments, the fluoropolymer is ePTFE.

In some embodiments, the thermal insulation component further comprises, in addition to a thermal insulation layer, a protective film, at least one adhesive layer, or any combination thereof. In some embodiments, the thermal insulation component comprises a plurality of adhesive layers. In some embodiments, at least one of the plurality of adhesive layers defines a portion of the protective film. In some embodiments, the thermal insulation component comprises a plurality of thermal insulation layers. In some embodiments, an adhesive layer is disposed between each thermal insulation layer. In some embodiments, the thermal insulation component consists of the thermal insulation layer. In some embodiments, the thermal insulation component consists of the thermal insulation layer and an adhesive layer. In some embodiments, the thermal insulation component consists of the thermal insulation layer and a plurality of adhesive layers. In some embodiments, the thermal insulation component consists of the thermal insulation layer and the protective film.

In some embodiments, the protective film comprises a polymer layer and an adhesive layer. In some embodiments, the protective film consists of the polymer layer. In some embodiments, the polymer layer of the protective film described herein comprises PET. In some embodiments, the polymer layer of the protective film described herein comprises PTFE. In some embodiments, the polymer layer of the protective film described herein comprises ePTFE.

In some embodiments, the polymer layer of the protective film described herein comprises polyethylene, polyimide, polyamide, polypropylene (such as but not limited to biaxially-oriented polypropylene "BOPP"), PVDF, or any combination thereof.

In some embodiments, the polymer layer of the protective film described herein may comprise ultra-high molecular weight polyethylene (UHMWPE), expanded polyethylene (ePE), low-density-polyethylene (LDPE), high-density-polyethylene (HDPE), Ethylene tetrafluoroethylene (ETFE), Fluorinated ethylene propylene (FEP), tetrafluoroethylene-hexafluoropropylene-vinylidene fluoride terpolymer (THV), glass reinforced epoxy, polystyrene, polyvinyl chloride (PVC), Polyether ether ketone (PEEK), aramid polymers, polymethyl methacrylate (PMMA), or any combination thereof.

In some embodiments, any adhesive layer described herein (e.g., any adhesive layer of the thermal insulation component, the protective film, or any combination thereof), may comprise an acrylic-based adhesive. In some embodiments, any adhesive layer described herein (e.g., any adhesive layer of the thermal insulation component, the protective film, or any combination thereof), may comprise an acrylic-based adhesive and a PET carrier film. In some embodiments, any adhesive layer described herein (e.g., any adhesive layer of the thermal insulation component, the protective film, or any combination thereof), may comprise a silicone-based adhesive. In some embodiments, any adhesive layer described herein (e.g., any adhesive layer of the thermal insulation component, the protective film, or any combination thereof), may comprise a thermoset adhesive, a urethane-based adhesive, a rubber adhesive, or any combination thereof. In some embodiments where there is a plurality of adhesive layers, each adhesive layer may be the same. In some embodiments where there is a plurality of adhesive layers, each adhesive layer may be different. In some embodiments where there is a plurality of adhesive layers, some adhesive layers may be the same while others may be different.

In some embodiments, a combined thickness of the protective film and any adhesive layer or adhesive layers of the thermal insulation component does not exceed a thickness of the thermal insulation layer. In some embodiments, a combined thickness of the protective film and any adhesive layer or adhesive layers of the thermal insulation component does not exceed 50% of a thickness of the thermal insulation component. In some embodiments, a combined thickness of the protective film and any adhesive layer or adhesive layers of the thermal insulation component does not exceed 40% of a thickness of the thermal insulation component. In some embodiments, a combined thickness of the protective film and any adhesive layer or adhesive layers of the thermal insulation component does not exceed 30% of a thickness of the thermal insulation component. In some embodiments, a combined thickness of the protective film and any adhesive layer or adhesive layers of the thermal insulation component does not exceed 20% of a thickness of the thermal insulation component. In some embodiments, a combined thickness of the protective film and any adhesive layer or adhesive layers of the thermal insulation component does not exceed 10% of a thickness of the thermal insulation component.

In some embodiments, the thermal insulation layer defines at least 50% of a total thickness of the thermal insulation component. In some embodiments, the thermal insulation layer defines at least 60% of a total thickness of the thermal insulation component. In some embodiments, the thermal insulation layer defines at least 70% of a total thickness of the thermal insulation component. In some embodiments, the thermal insulation layer defines at least 80% of a total thickness of the thermal insulation component. In some embodiments, the thermal insulation layer defines at least 90% of a total thickness of the thermal insulation component. In some embodiments, the thermal insulation layer defines at least 95% of a total thickness of the thermal insulation component. In some embodiments, the thermal insulation layer defines at least 99% of a total thickness of the thermal insulation component. In some embodiments, the thermal insulation layer defines 100% of a total thickness of the thermal insulation component.

In some embodiments, the at least one thermal insulation layer defines 50% to 99% of a total thickness of the thermal insulation component. In some embodiments, the at least one thermal insulation layer defines 60% to 99% of a total thickness of the thermal insulation component. In some embodiments, the at least one thermal insulation layer defines 70% to 99% of a total thickness of the thermal insulation component. In some embodiments, the at least one thermal insulation layer defines 80% to 99% of a total thickness of the thermal insulation component. In some embodiments, the at least one thermal insulation layer defines 90% to 99% of a total thickness of the thermal insulation component. In some embodiments, the at least one thermal insulation layer defines 95% to 99% of a total thickness of the thermal insulation component.

In some embodiments, the at least one thermal insulation layer defines 50% to 95% of a total thickness of the thermal insulation component. In some embodiments, the at least one thermal insulation layer defines 50% to 90% of a total thickness of the thermal insulation component. In some embodiments, the at least one thermal insulation layer defines 50% to 80% of a total thickness of the thermal insulation component. In some embodiments, the at least one thermal insulation layer defines 50% to 70% of a total thickness of the thermal insulation component. In some embodiments, the at least one thermal insulation layer defines 50% to 60% of a total thickness of the thermal insulation component.

In some embodiments, the at least one thermal insulation layer defines 60% to 95% of a total thickness of the thermal insulation component. In some embodiments, the at least one thermal insulation layer defines 70% to 90% of a total thickness of the thermal insulation component. In some embodiments, the at least one thermal insulation layer defines 75% to 85% of a total thickness of the thermal insulation component.

Non-limiting examples of a thermal insulation component according to the present disclosure are shown in FIG. 3A to 3J.

Figure 3A:
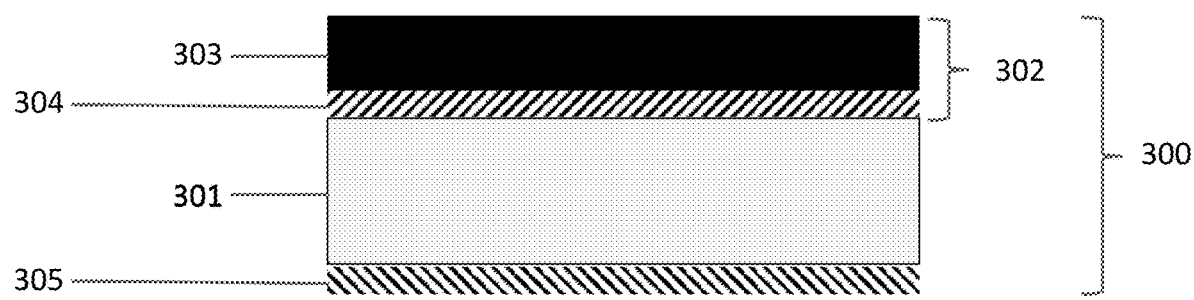
FIGS. 3A to 3J are non-limiting examples of thermal insulation components according to the present disclosure.
Figure 3B:

As shown in FIG. 3A, thermal insulation component 300 may comprise thermal insulation layer 301. As further illustrated in FIG. 3A, thermal insulation component 300 may, in some embodiments, comprise a protective film 302. In some embodiments, thermal insulation component 300 may consist of thermal insulation layer 301 and protective film 302. As shown in FIGS. 3A and 3B, in some embodiments, protective film 302 may comprise polymer layer 303 and adhesive layer 304. As illustrated in FIG. 3A, in some embodiments, adhesive layer 304 of the protective film 302 may be disposed between the thermal insulation layer 301 and the polymer layer 303 of the protective film 302.

As further illustrated in FIG. 3A, in some embodiments, thermal insulation component 301 also comprises adhesive layer 305, which may be referred to as a "second adhesive layer" in embodiments that include adhesive layer 304 as part of the protective film 302. In some embodiments, thermal insulation layer 301 is disposed between the protective film 302 and adhesive layer 305. In some embodiments, where the "second adhesive layer" is present, thermal insulation layer 301 may be disposed between adhesive layer 304 and second adhesive layer 305 as shown in FIG. 3A. In some embodiments of FIGS. 3A and 3B, adhesive layer 305 may be disposed between the thermal insulation layer 301 and the at least one antenna (not shown).

Figure 3C:

As shown in FIG. 3C, in some embodiments, the thermal insulation component 300 may consist of thermal insulation layer 301.

Figure 3D:
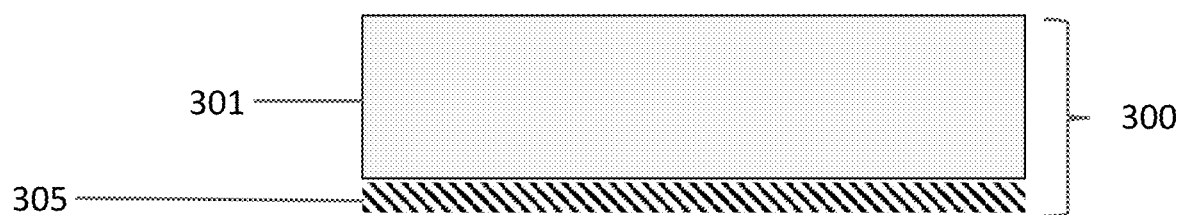

As shown in FIG. 3D, in some embodiments, thermal insulation component 300 may comprise the thermal insulation layer 301 and adhesive layer 305. In some embodiments, thermal insulation component 300 may consist of the thermal insulation layer 301 and the adhesive layer 305. In some embodiments of FIG. 3D, adhesive layer 305 may be disposed between the thermal insulation layer 301 and the at least one antenna (not shown).

Figure 3E:
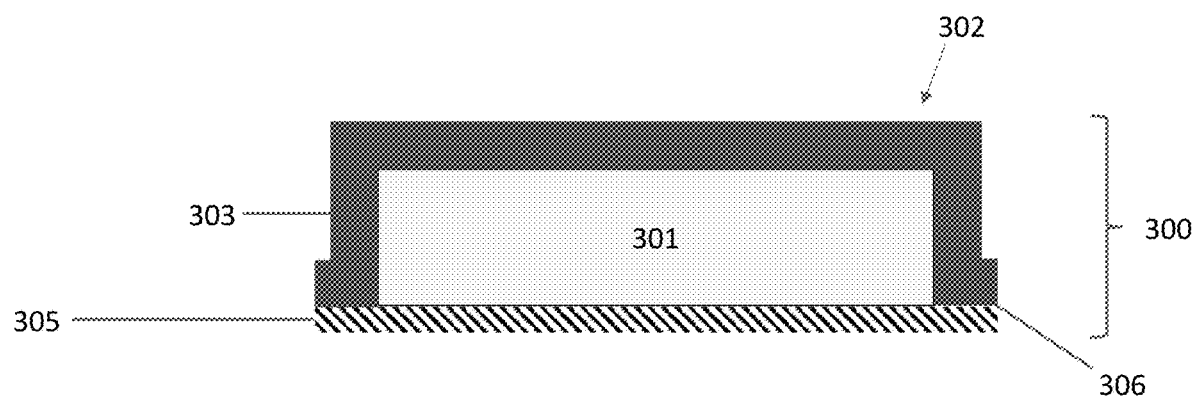

An additional non-limiting example of a thermal insulation component according to the present disclosure is shown in FIG. 3E. As shown in FIG. 3E, thermal insulation component 300 may comprise thermal insulation layer 301 and protective film 302. In some embodiments, protective film 302 may comprise polymer layer 303. In some embodiments, protective film 302 may consist of polymer layer 303. In some embodiments, adhesive layer 305 may be disposed between the thermal insulation layer 301 and the at least one antenna (not shown). In some embodiments, the adhesive layer 305 may contact protective film 302, polymer layer 303, or any combination thereof at edge seal 306.

Figure 3F:
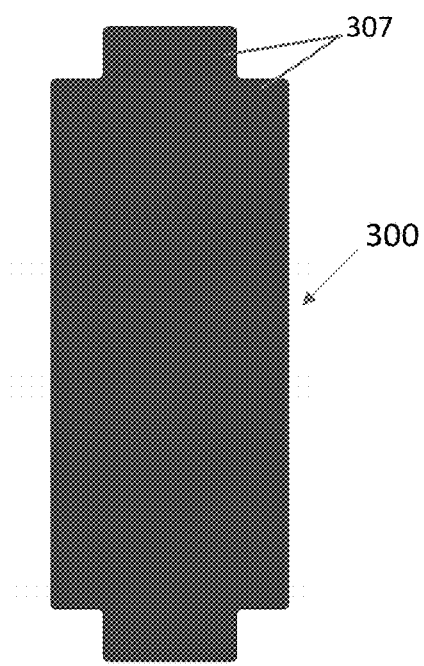
Figure 3G:
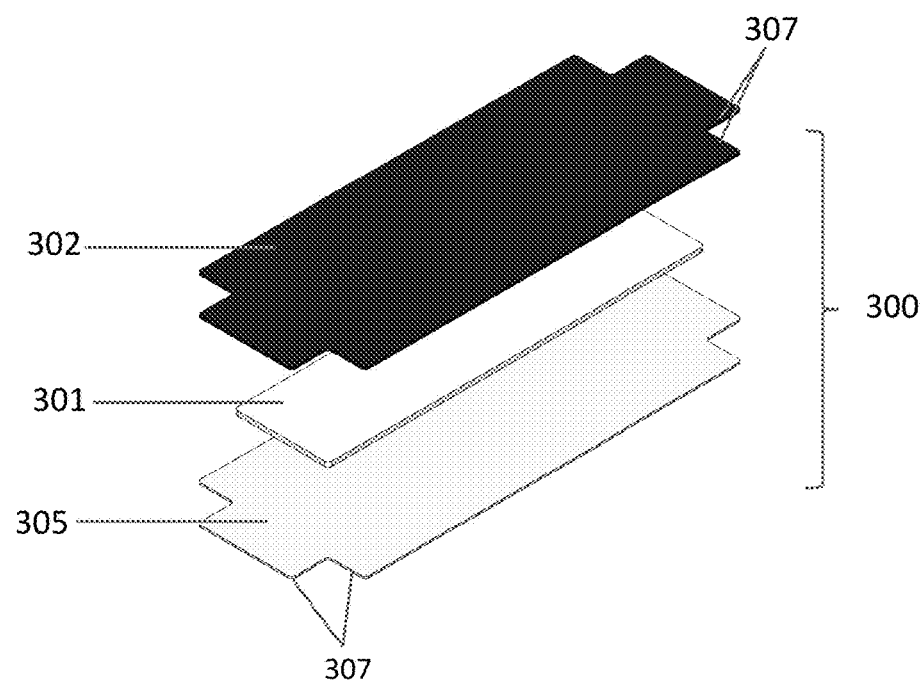
Figure 3H:
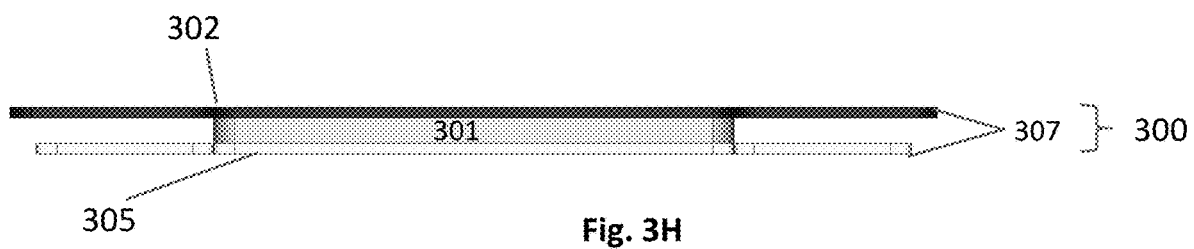

An additional non-limiting example of a thermal insulation component according to the present disclosure is shown in FIGS. 3F to 3H. Specifically, FIG. 3F is a top view of a thermal insulation component, FIG. 3G is an isometric exploded view of the thermal insulation component of FIG. 3F, and FIG. 3H is a cross-sectional view of the thermal insulation component of FIGS. 3F and 3G.

As shown in FIGS. 3F to 3H, thermal insulation component 300 may include a structure that includes a plurality of wings 307. As shown in FIGS. 3G and 3H, in some embodiments, the plurality of wings 307 may be present on the protective film 302, the adhesive layer 305, or any combination thereof. In some embodiments, the thermal insulation layer 301 also comprises a plurality of wings. In some embodiments, the thermal insulation layer 301 does not comprise a plurality of wings.

Figure 3I:

Yet another non-limiting example of a thermal insulation component is shown in FIG. 3I. As shown, thermal insulation component 300 may include protective film 302, which may, in some embodiments, also include polymer layer 302 and first adhesive layer 304. In some embodiments, thermal insulation component 300 may further include a plurality of thermal insulation layers 301A and 301B and a plurality of second adhesive layers 305A and 305B. As shown, in some embodiments, at least one adhesive layer, such as, but not limited to second adhesive layer 305A, may be disposed between two insulation layers, such as but not limited to thermal insulation layers 301A and 301B. In some embodiments, one of the plurality of adhesive layers, such as but not limited to adhesive layer 305B may be bonded to at least one antenna (not shown). In some embodiments, additional thermal insulation layers, e.g., [301C, 301D, . . . 301Z . . . ] may be present. In some embodiments, additional second adhesive layers, e.g., [301C, 301D, . . . 301Z . . . ] may be present.

Figure 3J:
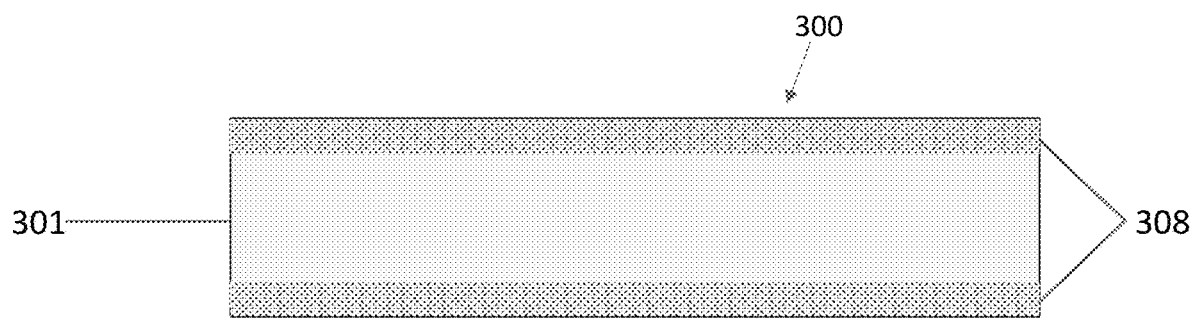

A further additional non-limiting example of a thermal insulation component according to the present disclosure is shown in FIG. 3J. As shown, thermal insulation component 300 may have a clad configuration, where the clad configuration comprises a plurality of ePTFE layers 308, where each of the plurality of ePTFE layers 308 is bonded to a surface of the thermal insulation layer 301. As described herein, infra, in some embodiments, the thermal insulation layer 301 may be a PTFE reinforced layer, such as but not limited to a PTFE reinforced aerogel. In some non-limiting examples, the PTFE reinforced aerogel of the thermal insulation component is in the clad configuration Turning to the assembly, in some embodiments, the assembly may be disposed within an enclosure. The enclosure may form a portion of any device, such as but not limited to, a mobile device, a cell-phone, a laptop, an augmented reality device, a virtual reality device, a headset, an automotive radar, or any combination thereof. In some embodiments, the device may be bonded to the enclosure by any suitable bonding mechanism described herein.

In some embodiments, the assembly may further comprise a power amplifier. In some embodiments, the power amplifier may be in physical contact with the assembly. In some embodiments, the power amplifier may be bonded to the assembly using any suitable bonding mechanism described herein. In some embodiments, the power amplifier may also be disposed within the enclosure.

Figure 4:
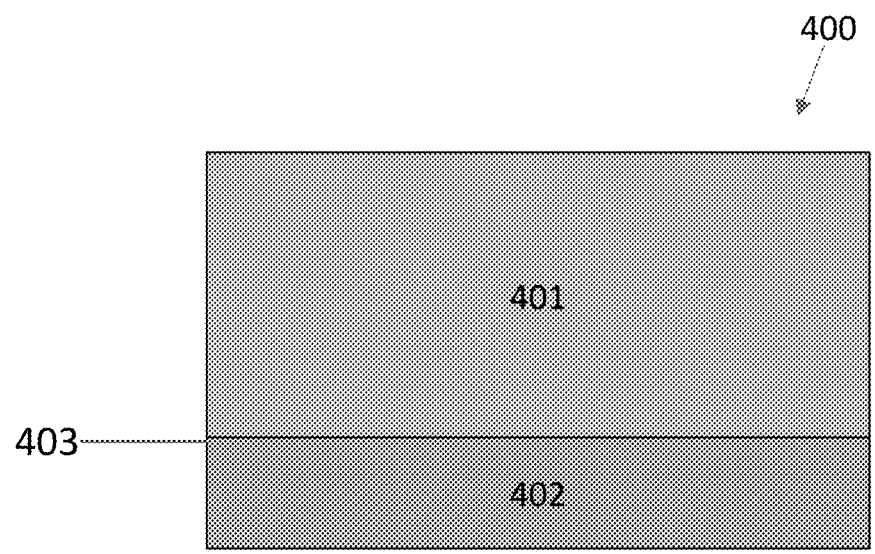
FIG. 4 is a non-limiting example of a location where an operating temperature of an assembly may be measured.

In some embodiments, an operating temperature of the assembly may be measured at an interface between the thermal insulation component and the at least one antenna. A non-limiting example of an assembly having an interface at which the operating temperature of the assembly may be measured is shown in FIG. 4. As shown, the operating temperature of an assembly 400 may be measured at interface 403 between the thermal insulation component 401 and the at least one antenna 402.

In some embodiments, the assembly has an operating temperature ranging from 20° C. to 120° C. In some embodiments, the assembly has an operating temperature ranging from 40° C. to 120° C. In some embodiments, the assembly has an operating temperature ranging from 60° C. to 120° C. In some embodiments, the assembly has an operating temperature ranging from 80° C. to 120° C. In some embodiments, the assembly has an operating temperature ranging from 100° C. to 120° C.

In some embodiments, the assembly has an operating temperature ranging from 20° C. to 100° C. In some embodiments, the assembly has an operating temperature ranging from 20° C. to 80° C. In some embodiments, the assembly has an operating temperature ranging from 20° C. to 60° C. In some embodiments, the assembly has an operating temperature ranging from 20° C. to 40° C.

In some embodiments, the assembly has an operating temperature ranging from 40° C. to 100° C. In some embodiments, the assembly has an operating temperature ranging from 60° C. to 80° C.

Figure 5A:
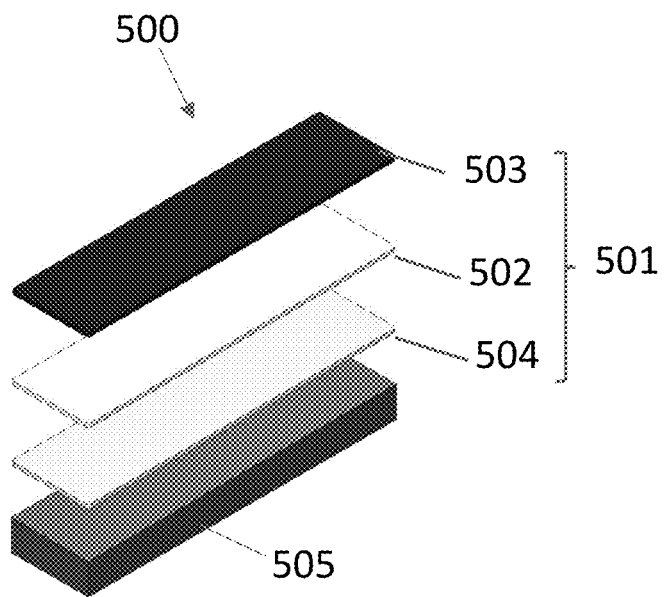
FIGS. 5A to 5K are non-limiting examples of assemblies according to the present disclosure.
Figure 5B:
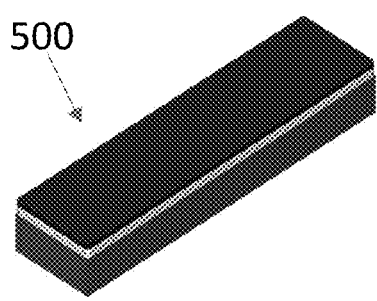
Figure 5C:
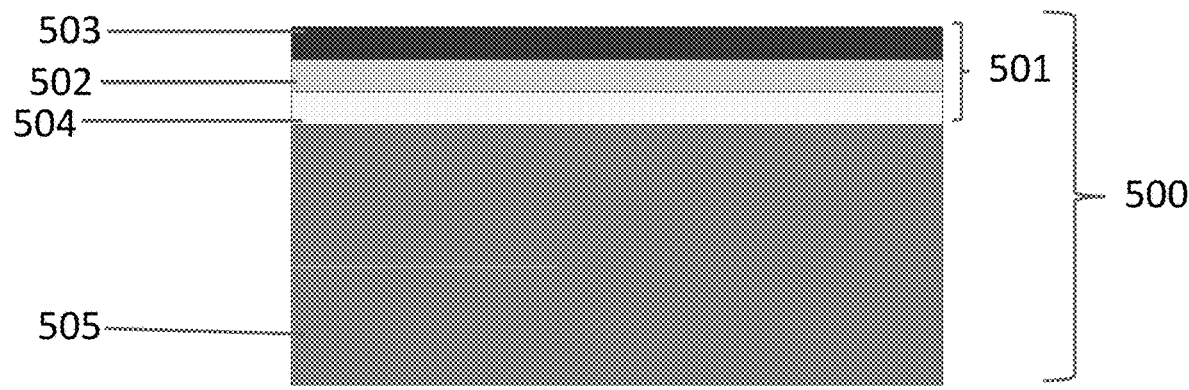

A non-limiting example of an exemplary assembly is shown in FIGS. 5A to 5C. FIG. 5A is an exploded view of an exemplary assembly. FIG. 5B is a collapsed view of the exemplary assembly of FIG. 5A. FIG. 5C is a cross-sectional view of the exemplary assembly of FIGS. 5A and 5B.

As shown in FIGS. 5A to 5C, assembly 500 may, in some embodiments, include thermal insulation component 501 and at least one antenna 505. In some embodiments, thermal insulation component 501 may include thermal insulation layer 502, protective film 503, and adhesive layer 504.

Figure 5D:
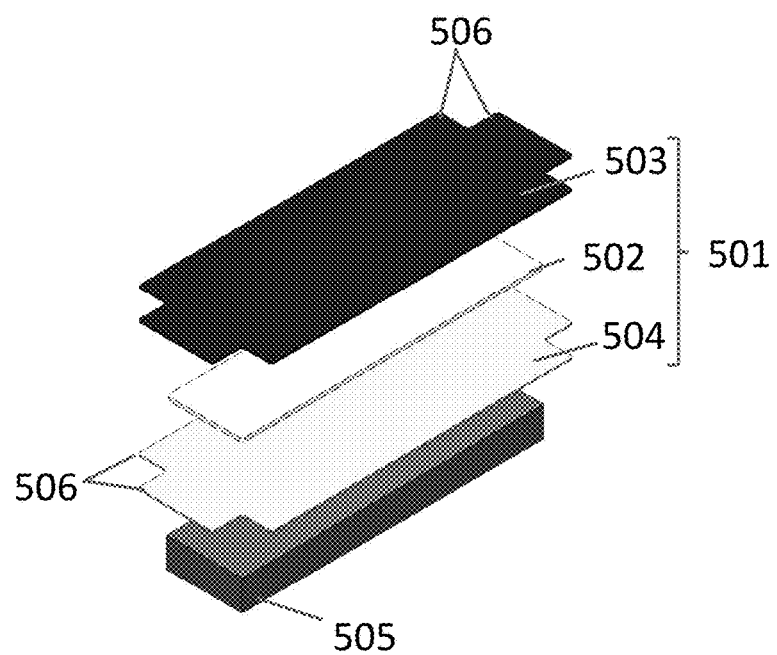
Figure 5E:
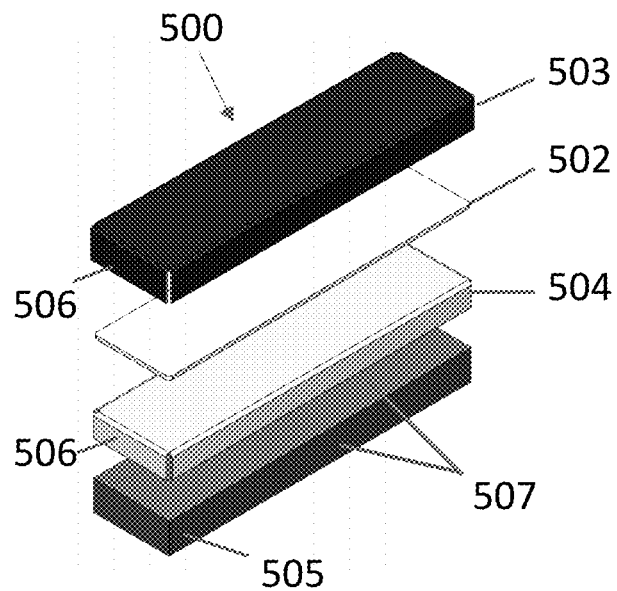
Figure 5F:
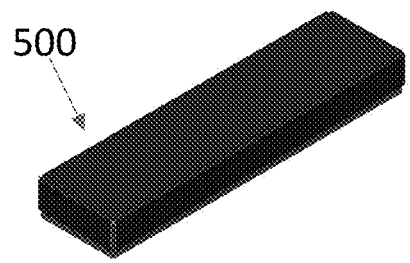
Figure 5G:
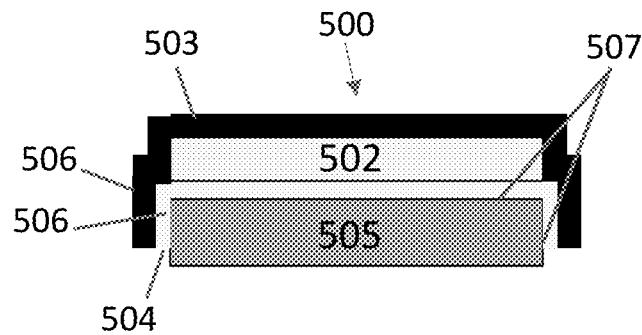

Another non-limiting example of an exemplary assembly is shown in FIGS. 5D to 5G. FIG. 5D is an exploded view of an exemplary assembly with wings 506 unfolded. FIG. 5E is an exploded view of an exemplary assembly with wings 506 folded. FIG. 5F is a collapsed view of the exemplary assembly of FIGS. 5D and 5E. FIG. 5G is a cross-sectional view of the exemplary assembly of FIGS. 5D to 5G.

As shown in FIGS. 5D to 5G, assembly 500 may, in some embodiments, include thermal insulation component 501 and at least one antenna 505. In some embodiments, thermal insulation component 501 may include thermal insulation layer 502, protective film 503, and adhesive layer 504.

As shown protective film 503, adhesive layer 504, or any combination thereof, may have a plurality of wings 506. In some embodiments, the plurality of wings 506 may be folded so as to form assembly 500. In some embodiments, such as the embodiment of FIG. 5G, the protective film 503 may surround the thermal insulation layer 502.

In some embodiments, the at least one antenna 505 may take the form of an antenna array having a plurality of planes 507. In some of these embodiments, such as but not limited to some embodiments of FIG. 5G, the thermal insulation component 501 may be in contact with at least two of the plurality of planes 507. This can occur, in one non-limiting example of FIGS. 5E and 5G, by folding wings 506 of the protective film 503, the adhesive layer 504, or any combination thereof, around the at least one antenna 505 (which may take the form of an antenna array), such that the wings 506 of the protective film 503, the adhesive layer 504, or any combination thereof, contact the plurality of planes 507.

Figure 5H:
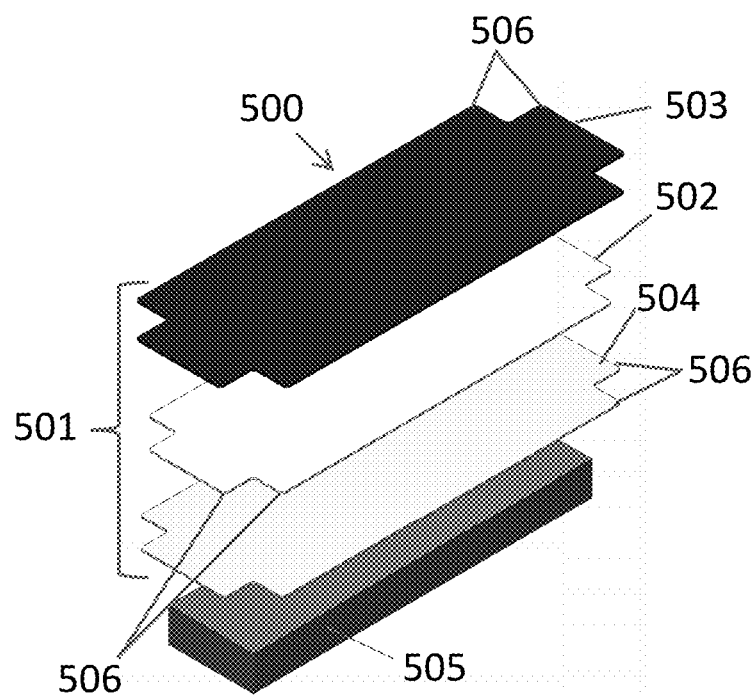
Figure 5I:
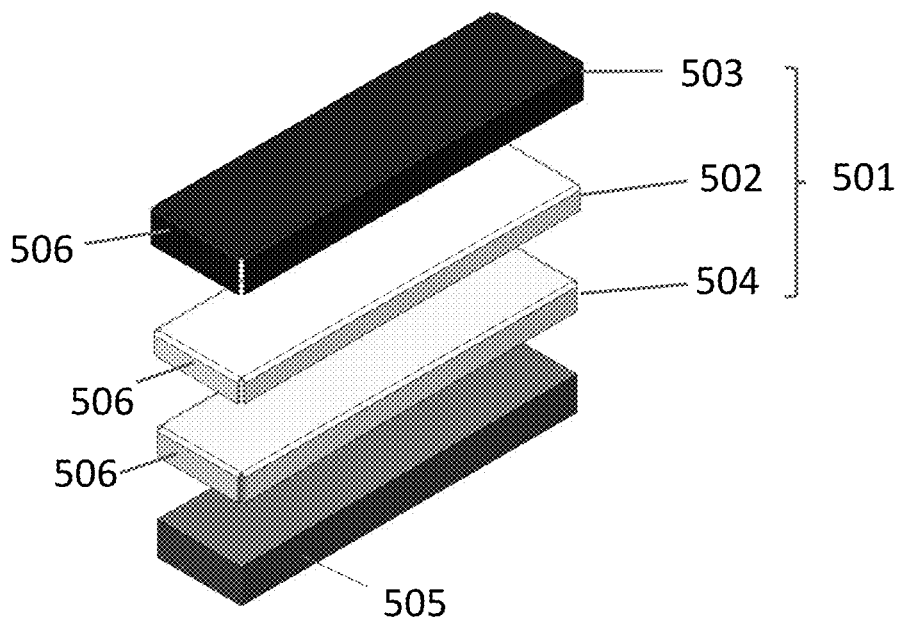
Figure 5J:
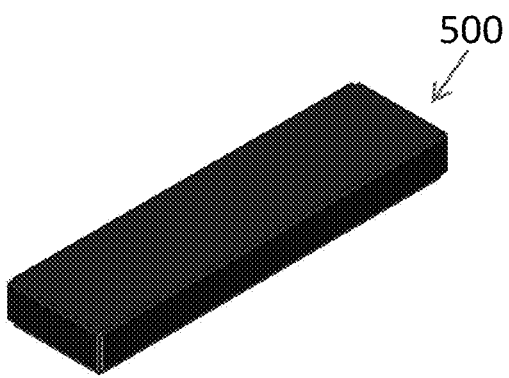
Figure 5K:
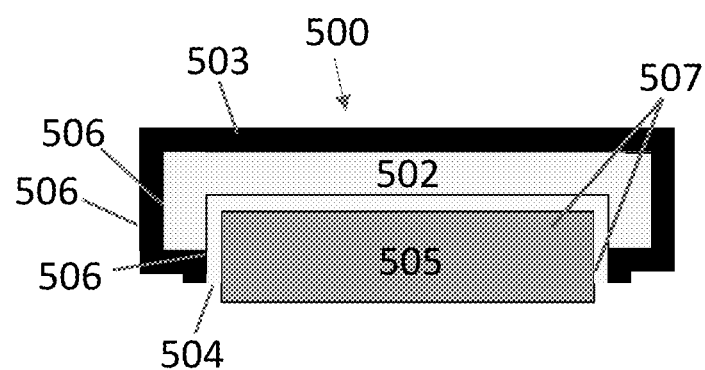

Another non-limiting example of an exemplary assembly is shown in FIGS. 5H to 5K. FIG. 5H is an exploded view of an exemplary assembly with wings 506 unfolded. FIG. 5I is an exploded view of an exemplary assembly with wings 506 folded. FIG. 5J is a collapsed view of the exemplary assembly of FIGS. 5H and 5I. FIG. 5K is a cross-sectional view of the exemplary assembly of FIGS. 5H to 5J.

As shown in FIGS. 5H to 5K, thermal insulation layer 502 of the thermal insulation component 501 may also include wings 506, which may also contact the plurality of planes 507 of at least one antenna 505 (which may take the form of an antenna array). Accordingly, in some embodiments, the wings 506 of thermal insulation component 502, the protective film 503, the adhesive layer 504, or any combination thereof, may contact the plurality of planes 507.

Figure 6A:
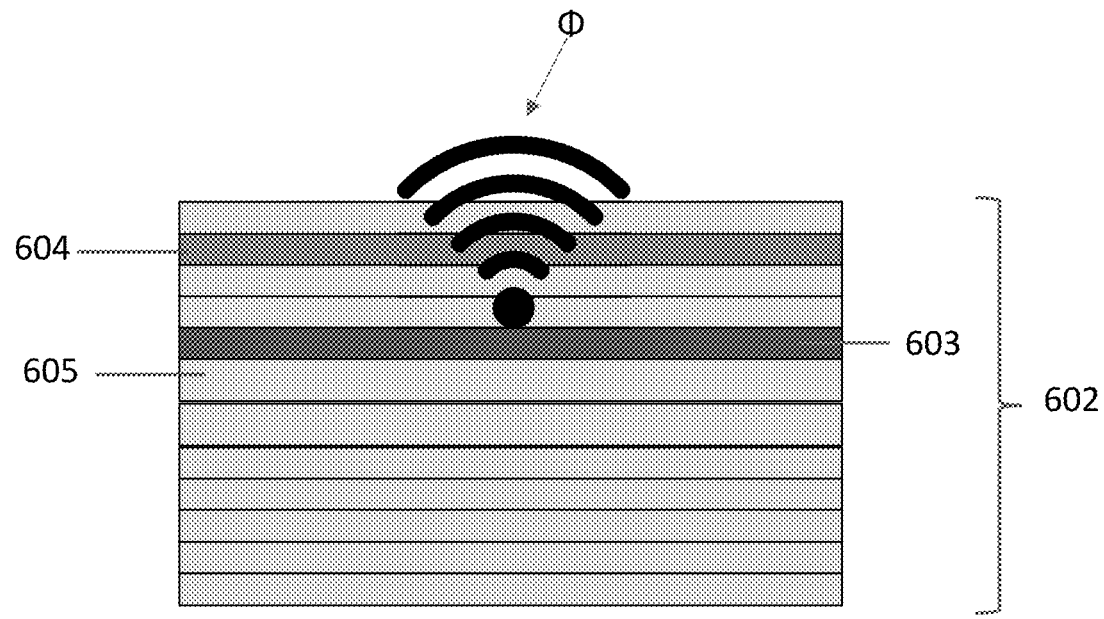
FIGS. 6A and 6B depict a non-limiting example of an assembly having a thermal insulation component embedded into an antenna array.
Figure 6B:
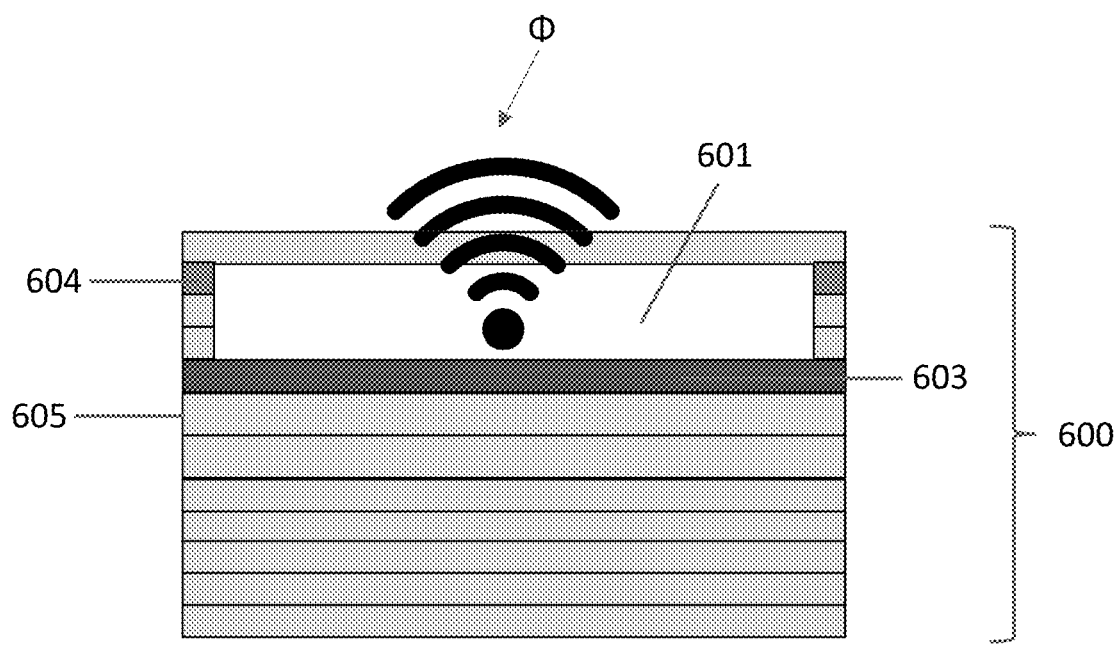

Yet another non-limiting example of an assembly is shown in FIGS. 6A and 6B. FIG. 6A depicts a non-limiting example of an antenna array 602 that includes antenna patches 603, a plurality of dielectric/copper layers 604, and a plurality of copper layers 605. As shown in FIG. 6B, in some embodiments, assembly 600 may include a thermal insulation component 601, which may be embedded within the antenna array 602 of FIG. 6A. Moreover, in some embodiments, such as the embodiment of FIG. 6B, the thermal insulation component 601 may be disposed within a field (Φ) of RF communication generated by antenna array 602. In some embodiments, Φ propagates through antenna array 602 In some embodiments, copper layers 605 consist of copper. In some embodiments, antenna patches 603 are disposed below the thermal insulation component 601.

Figure 7:
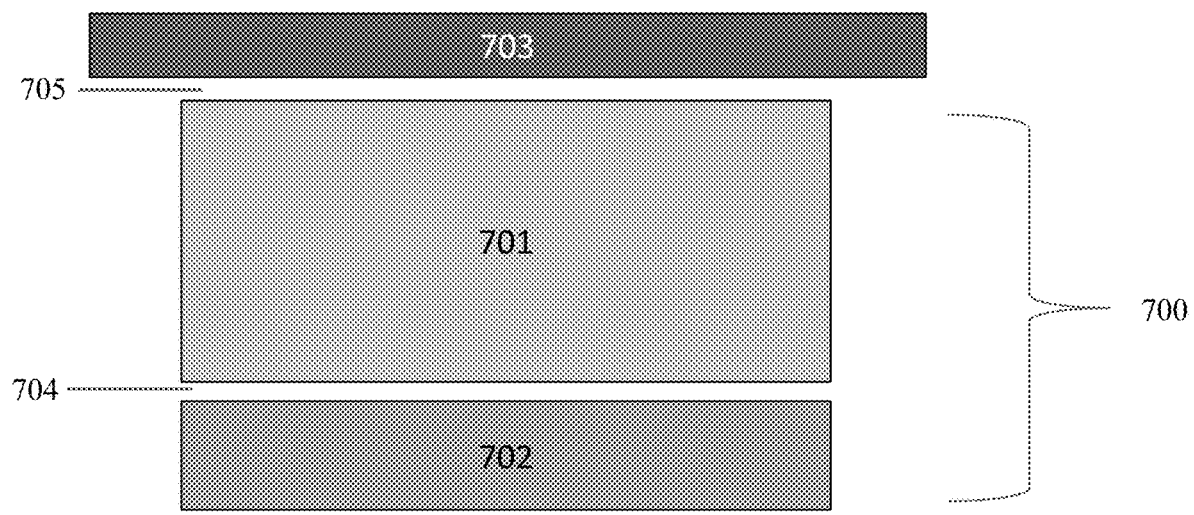
FIG. 7 depicts a non-limiting example of an assembly within an enclosure.

A further non-limiting example of an assembly is shown in FIG. 7. As shown, assembly 700 may include thermal insulation component 701 and at least one antenna 702. In some embodiments, thermal insulation component may be bonded to at least one antenna 702 by adhesive layer 704. In some embodiments, assembly 700 may be housed within an enclosure 703. In some embodiments, enclosure 703 defines a part of a device, such as but not limited to, a mobile device. In some embodiments, assembly 700 may be bonded to the enclosure by a second adhesive layer 705. As shown, in some embodiments, second adhesive layer 704 may be disposed between the thermal insulation component 701 and the at least one antenna.

Some embodiments of the present disclosure relate to a method of using the assembly. In some embodiments, the method comprises obtaining the assembly and transmitting a field of RF communication from the at least one antenna at an operating frequency ranging from 6 GHz to 100 GHz. In some embodiments, the method comprises obtaining the assembly and transmitting a field of RF communication from the at least one antenna at an operating frequency ranging from 10 GHz to 100 GHz. In some embodiments, the method comprises obtaining the assembly and transmitting a field of RF communication from the at least one antenna at an operating frequency ranging from 20 GHz to 100 GHz. In some embodiments, the method comprises obtaining the assembly and transmitting a field of RF communication from the at least one antenna at an operating frequency ranging from 30 GHz to 100 GHz. In some embodiments, the method comprises obtaining the assembly and transmitting a field of RF communication from the at least one antenna at an operating frequency ranging from 40 GHz to 100 GHz. In some embodiments, the method comprises obtaining the assembly and transmitting a field of RF communication from the at least one antenna at an operating frequency ranging from 50 GHz to 100 GHz. In some embodiments, the method comprises obtaining the assembly and transmitting a field of RF communication from the at least one antenna at an operating frequency ranging from 60 GHz to 100 GHz. In some embodiments, the method comprises obtaining the assembly and transmitting a field of RF communication from the at least one antenna at an operating frequency ranging from 70 GHz to 100 GHz. In some embodiments, the method comprises obtaining the assembly and transmitting a field of RF communication from the at least one antenna at an operating frequency ranging from 80 GHz to 100 GHz. In some embodiments, the method comprises obtaining the assembly and transmitting a field of RF communication from the at least one antenna at an operating frequency ranging from 90 GHz to 100 GHz.

In some embodiments, the method comprises obtaining the assembly and transmitting a field of RF communication from the at least one antenna at an operating frequency ranging from 6 GHz to 90 GHz. In some embodiments, the method comprises obtaining the assembly and transmitting a field of RF communication from the at least one antenna at an operating frequency ranging from 6 GHz to 80 GHz. In some embodiments, the method comprises obtaining the assembly and transmitting a field of RF communication from the at least one antenna at an operating frequency ranging from 6 GHz to 70 GHz. In some embodiments, the method comprises obtaining the assembly and transmitting a field of RF communication from the at least one antenna at an operating frequency ranging from 6 GHz to 60 GHz. In some embodiments, the method comprises obtaining the assembly and transmitting a field of RF communication from the at least one antenna at an operating frequency ranging from 6 GHz to 50 GHz. In some embodiments, the method comprises obtaining the assembly and transmitting a field of RF communication from the at least one antenna at an operating frequency ranging from 6 GHz to 40 GHz. In some embodiments, the method comprises obtaining the assembly and transmitting a field of RF communication from the at least one antenna at an operating frequency ranging from 6 GHz to 30 GHz. In some embodiments, the method comprises obtaining the assembly and transmitting a field of RF communication from the at least one antenna at an operating frequency ranging from 6 GHz to 20 GHz. In some embodiments, the method comprises obtaining the assembly and transmitting a field of RF communication from the at least one antenna at an operating frequency ranging from 6 GHz to 10 GHz.

In some embodiments, the method comprises obtaining the assembly and transmitting a field of RF communication from the at least one antenna at an operating frequency ranging from 10 GHz to 90 GHz. In some embodiments, the method comprises obtaining the assembly and transmitting a field of RF communication from the at least one antenna at an operating frequency ranging from 20 GHz to 80 GHz. In some embodiments, the method comprises obtaining the assembly and transmitting a field of RF communication from the at least one antenna at an operating frequency ranging from 30 GHz to 70 GHz. In some embodiments, the method comprises obtaining the assembly and transmitting a field of RF communication from the at least one antenna at an operating frequency ranging from 40 GHz to 60 GHz.

Some embodiments of the present disclosure relate to a method of making the assembly. In some embodiments, the method comprises obtaining at least one antenna and placing a thermal insulation component on at least one surface of the at least one antenna, so as to form the assembly. In some embodiments, the method comprises forming the thermal insulation component from a thermal insulation layer and a protective film. In some embodiments, the method comprises forming the protective film from a polymer layer and an adhesive layer. In some embodiments, the method comprises forming the thermal insulation component by bonding the adhesive layer of the protective film to the thermal insulation layer. In some embodiments, the method comprises forming the thermal insulation component from a thermal insulation layer and an adhesive layer. In some embodiments, the method comprises forming the thermal insulation component from a thermal insulation layer, an adhesive layer, and a protective film. In some embodiments, the method comprises placing the thermal insulation component on at least one surface of the at least one antenna. In some embodiments, the method comprises bonding the thermal insulation component to at least one surface of the at least one antenna. In some embodiments, the method comprises placing the thermal insulation component on at least two planes of an antenna array described herein. In some embodiments, the method comprises placing the assembly in an enclosure (e.g., an enclosure of a mobile device).

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

EXAMPLES

Test Methods

Thermal Conductivity Test Method: Thermal conductivity is measured using a TA® Instruments FOX50 Heat Flow Meter. This is a steady state method that conforms to the ASTM C518 standard. In the FOX50 tester, the thermal conductivity of a material is measured on a two-inch diameter sample at 25° C. with the temperature of the hot plate set to 30° C. and the cold plate set to 20° C. In addition, the sample was measured under 6 psi of pressure.

Dielectric Property Test Method: The IEC 61189-2-721 Edition 1 2015-04 standard describes the method used to measure the dielectric constant and loss tangent of a material using a Split Post Dielectric Resonator (SPDR). A 10 GHz SPDR measures the dielectric properties of a flat sheet sample with rectangular geometry, 100 mm×60 mm. The samples were not preconditioned and the thickness was measured using a snap gauge with 1 psi of pressure.

Thermogravimetric Analysis Test Method: The thermogravimetric analysis (TGA) data was collected using a TA® Instruments Q5000 IR. 10-20 mg of sample was placed in a tared platinum sample pan. Samples were analyzed by heating to 100° C. under nitrogen purge gas and holding the sample isothermally for 20 minutes. The samples were then heated to 800° C. at 50° C./minute and held isothermally for 10 minutes. The purge gas was then switched to air and the samples were held isothermally for a further 15 minutes. The weight % aerogel loading is calculated by dividing the residual sample mass at the end of the test by the mass of the sample after the initial isothermal hold at 100° C. The initial isothermal hold removes residual water in the sample to get an accurate reading of the initial mass of the sample. The residual sample mass at the end of the test should be entirely comprised of aerogel, as all other constituents have burned off the sample after the 800° C. isothermal hold.

Example 1

Measured material attributes of exemplary thermal insulation components ("components") and exemplary constituent layers (e.g., a thermal insulation layer, at least one adhesive layer, a protective film, a polymer layer, or any combination thereof) were used to model thermal and RF performance of various component designs. Components were evaluated using the equations described in FIGS. 8 and 9. Designs were iterated to identify an operable design space for components that would meet the requirements. Material inputs were measured per the Thermal Conductivity Test Method and Dielectric Property Test Method. Outputs (Results) were determined using FIGS. 8 and 9.

Figure 8:
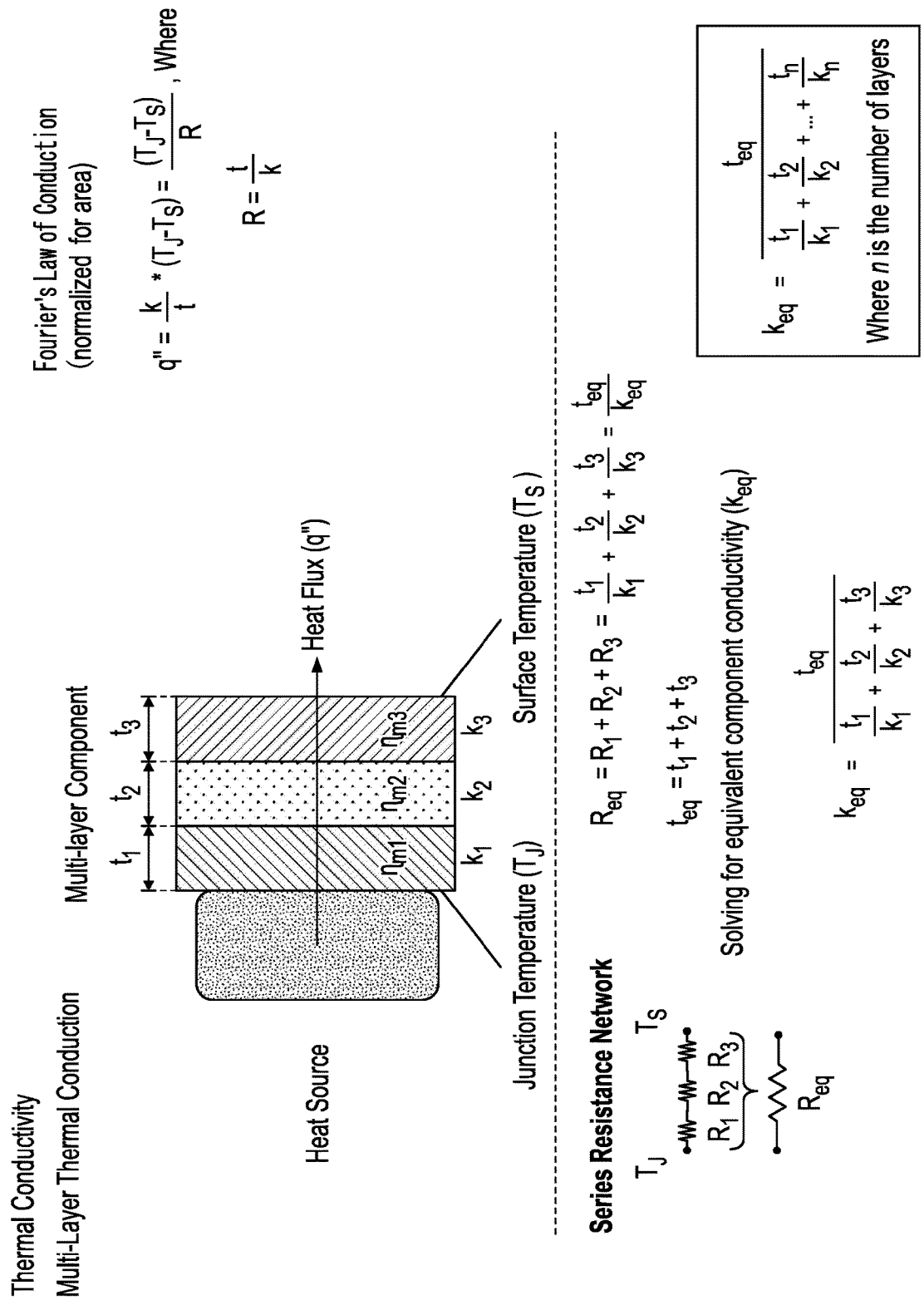
FIG. 8 is a non-limiting example of a model for calculating thermal conductivity.
Figure 9:
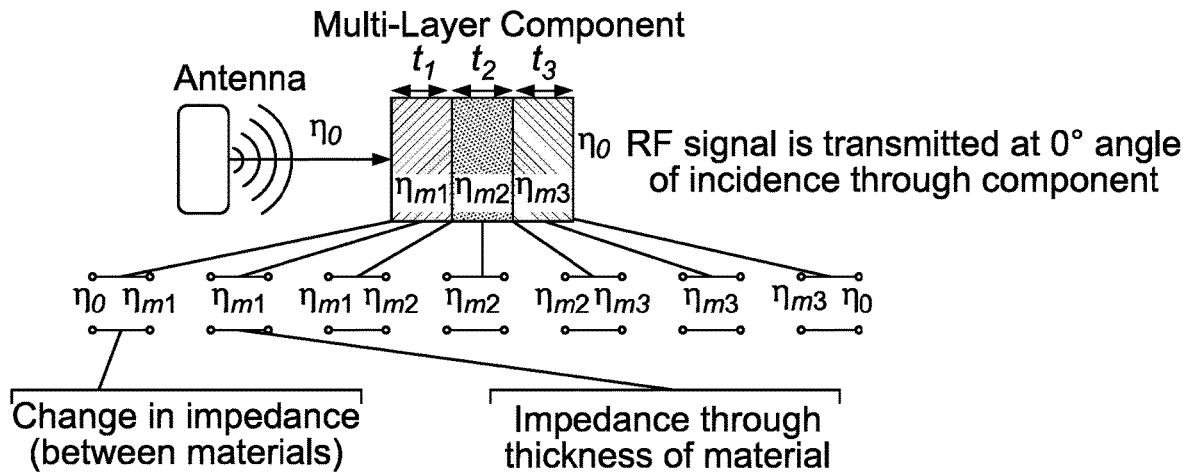
FIG. 9 is a non-limiting example of a model for calculating RF transmission characteristics.

As shown in FIGS. 8 and 9, the component design space can, in some instances, be defined by the thermal conductivity (k), dielectric constant (Dk), and loss tangent (Df) of the constituent layers in the component stack, and can in some embodiments, be defined by a total component thickness and composition (percentage) by thickness of each constituent layer. For example, an acceptable design space for a thermal insulation component may be based on materials chosen and the final composition.

Figure 10A:
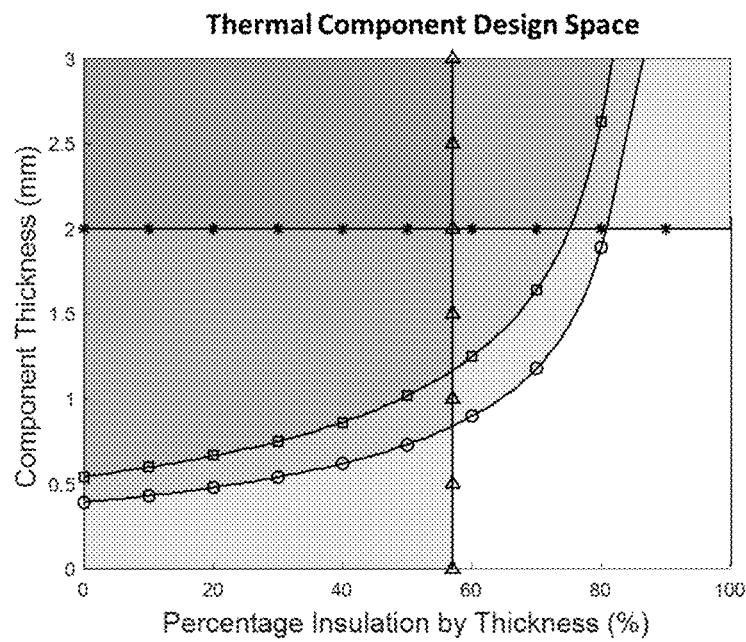
FIGS. 10A to 10D illustrate exemplary design spaces for some non-limiting assemblies of the present disclosure.
Figure 10B:
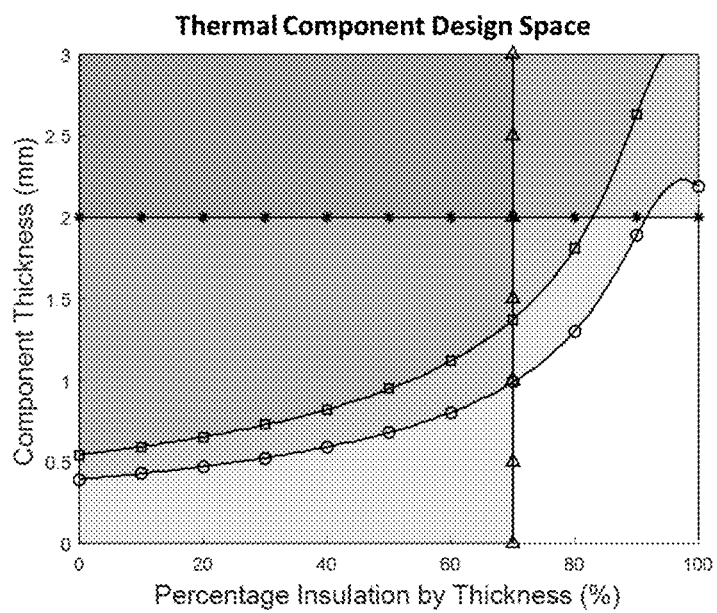
Figures 10C, 10D:
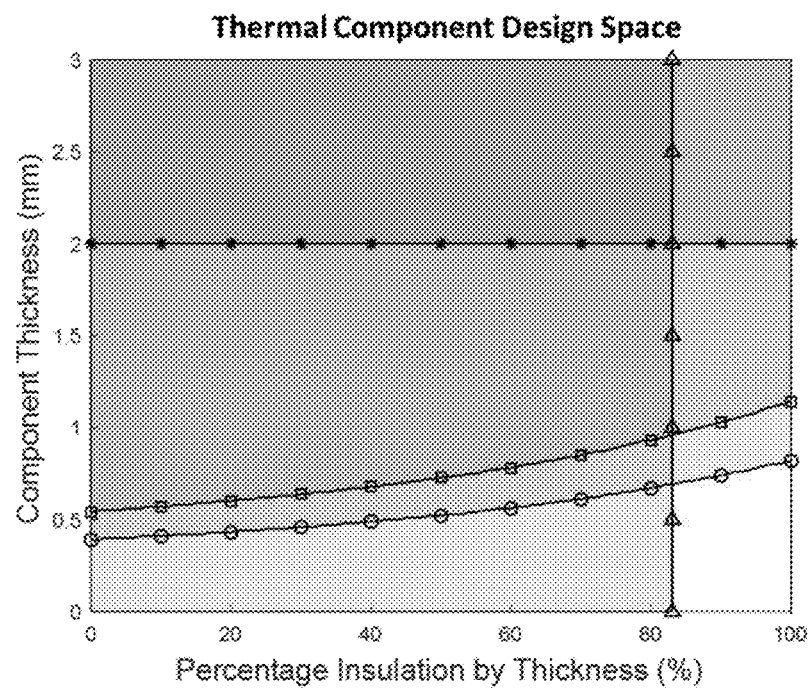

In the present Example, three example components (two constituent layers each) were constructed using properties for the thermal insulation layer that encompass the bounds of currently measured materials. In order to visually simplify the effects of different parameters on the operable design space, properties of the protective film were fixed for all example components. The thickness of the protective film was not fixed such that the protective film could be constructed into various exemplary designs alongside the thermal insulation layer. FIGS. 10A-C show a graph of each component as a function of component thickness in mm (on the y-axis), and % insulation by thickness (on the x-axis). FIG. 10D depicts a key. The properties for each graph are displayed in Table 1 below.

TABLE 1

Material Properties of Constituent Layers of FIGS. 10A-10C

| FIG. NO. | Thermal Insulation Layer | | | Protective Film | | |
|---|---|---|---|---|---|---|
| | k (W/m · K) | Dk | Df | k (W/m · K) | Dk | Df |
| 10A | 0.015 | 1.1 | 0.005 | 0.2 | 2.5 | 001 |
| 10B | 0.018 | 1.1 | 0.03 | | | |
| 10C | 0.021 | 1.8 | 0.005 | | | |

In FIGS. 10A-C, all area that is white is considered operable design space. Area that is grey fails one or multiple of the thermal, RF, and thickness limits described above (and denoted in the key of FIG. 10D).

Referring again to FIG. 8, the thermal conductivity (k) of the component may depend on respective conductivities of the constituent components and the percentage thickness of each constituent layer in the component. This calculation presents itself as a vertical limit in the graphs since it is not dependent on total component thickness. Moving from FIG. 10A to FIG. 10B to FIG. 10C, an increase in thermal conductivity of thermal insulation layer moves the thermal limit to the right (increased % insulation by thickness), narrowing the operable component design space.

Referring to FIG. 9, the RF transmission loss of the component, at a given frequency, may depend on the dielectric constant (Dk), loss tangent (Df), and thickness of each constituent layer in the component. Looking at FIG. 10A as the control condition, utilizing lower end values of Dk (1.1) and Df (0.005) measured for thermal insulation layers, the operable design space (for RF limits only) can extend up to the 2 mm thickness limit at ≥~80% insulation by thickness. Moving to FIG. 10B, the Dk was held at 1.1 and the Df was increased to an upper end value measured for thermal insulation layers (0.03). The operable design space (for RF limits only) in FIG. 10B may be minimally narrowed from FIG. 10A, extending up to the 2 mm thickness limit at ≥~90% insulation by thickness. Moving to FIG. 10C, the Df was returned to 0.005 and the Dk was increased to an upper end value measured for thermal insulation layers (1.8). As shown, the operable design space (RF limits only) can be significantly narrowed from FIGS. 10A and 10B, yielding functional components of ~0.5 mm thickness at ≥~85% insulation by thickness, and ~1.0 mm thickness at 100% insulation by thickness.

As demonstrated in the present Example, in some aspects of the present disclosure, the dielectric constant of the thermal insulation layer may be more impactful than the loss tangent. With this, in some embodiments, thermal insulation layers with low thermal conductivity (k<0.025 W/m·K), low dielectric constants (Dk<1.5), and moderate loss tangents (Df<0.03) may present a unique advantage for thermal insulation components in millimeter-scale wave antenna applications.

Example 2

Material attributes for constituent layers of thermal insulation component designs were either measured or obtained from data sheets or literature references. The thermal conductivity, dielectric constant and loss tangent values were obtained for: adhesive layers, thermal insulation layers, and protective films. Unless denoted otherwise, samples were measured according to the procedures detailed for "Thermal Conductivity Test Method" and "Dielectric Property Test Method" (see, supra "Test Methods"). Table 2 summarizes the properties for each constituent layer of the present Example. The layers of Table 2 are the measured constituent layers that will be referenced for modeling. If multiple samples of a particular constituent layer were measured, a range is shown to capture the measurement values obtained.

TABLE 2

Measured Constituent Layers

| Constituent Layer Sample Type | Constituent Layer code | Material Manufacturer | Product P/N | Material Description |
|---|---|---|---|---|
| Thermal Insulation Layer | TL1 | W. L. Gore & Associates, Inc. | — | Silica aerogel reinforced with PTFE |
| Thermal Insulation Layer | TL2 | W. L. Gore & Associates, Inc. | — | Silica aerogel reinforced with PTFE, clad with ePTFE membranes |
| Thermal Insulation Layer | TL3 | Sheen Electronical Technology Co., Ltd | SY300 | Silica aerogel coating reinforced with PET carrier film |
| Protective Film: Polymer Layer + Adhesive Layer | PF1 | Sidike New Materials Science and Technology Co., Ltd | SDK7140 | PET single-sided acrylic adhesive tape |
| Protective Film: Polymer Layer | PF2 | W. L. Gore & Associates, Inc. | — | ePTFE Film |
| Adhesive Layer (Second Adhesive Layer) | AL1 | Sidike New Materials Science and Technology Co., Ltd | SDK97C01 | PET double-sided acrylic adhesive tape |

Measured Attributes

| Constituent Layer code | Thickness (mm) | Loading of Aerogel (wt %) | Properties Thermal Conductivity, k (W/m · K) | Dielectric Constant, Dk | Loss Tangent, Df |
|---|---|---|---|---|---|
| TL1 | 0.25-0.78 | 55 | 0.015-0.02 | 1.16-1.32 | 0.0095-0.0203 |
| TL2 | 0.1-0.53 | 52 | 0.015-0.02 | 1.18-1.36 | 0.0096-0.022 |
| TL3 | 0.08-0.12 | 22 | 0.033-0.045 | 1.64 | 0.011 |
| PF1 | 0.01 | N/A | 0.19[a] | 2.75 | 0.023 |
| PF2 | 0.006 | N/A | 0.06 | 1.1-2 | 0.00008-0.0002 |
| AL1 | 0.005-0.01 | N/A | 0.19[a] | 2.44 | 0.014 |

[a]PET and acrylic values obtained from the following literature sources:
https://www.electronics-cooling.com/2001/05/the-thermal-conductivity-of-unfilled-plastics/,
http://www.matweb.com/search/datasheet.aspx?MATGUID=632572aeef2a4224b5ac8fbdf1b6f77 a. PET and acrylic values obtained from the following literature sources: https://www.electronics-cooling.com/2001/05/the-thermal-conductivity-of-unfilled-plastics/, http://www.matweb.com/search/datasheet.aspx?MATGUID=632572aeef2a4224b5ac8fbd4f1b6f77

Additionally, thermal insulation components, comprised of several constituent layers, were tested. Unless denoted otherwise, layers were measured according to the procedures detailed for "Thermal Conductivity Test Method" and "Dielectric Property Test Method." Table 3 summarizes the properties for the thermal insulation components. The layers of Table 3 are the measured components that will be referenced for modeling. If multiple samples of a component were measured, a range is shown to capture the measurement values obtained

TABLE 3

Measured Thermal Insulation Components

| Component code | Insulation Manufacturer | Product P/N |
|---|---|---|
| TC1 | W. L. Gore & Associates, Inc. | — |
| TC2 | W. L. Gore & Associates, Inc. | — |
| TC3 | W. L. Gore & Associates, Inc. | — |

TABLE 3-continued

Measured Thermal Insulation Components

| | | |
|---|---|---|
| TC4 | Panasonic (sourced from Digi-Key ® Electronics) | NASBIS ® EYG-Y0912QN6S |
| TC5 | Panasonic (sourced from Digi-Key ® Electronics) | NASBIS ® EYG-Y0912QN4S |

Material Description

| Component code | Thermal Insulation Layer | Protective film | Adhesive Layer (Second Adhesive) |
|---|---|---|---|
| TC1 | Silica aerogel reinforced with PTFE | ePTFE Film + PET double-sided acrylic adhesive tape | PET double-sided acrylic adhesive tape |
| TC2 | Silica aerogel reinforced with PTFE, clad with ePTFE membranes | PET single-sided acrylic adhesive tape | PET double-sided acrylic adhesive tape |
| TC3 | Silica aerogel reinforced with PTFE | PET single-sided acrylic adhesive tape | PET double-sided acrylic adhesive tape |
| TC4 | Silica aerogel reinforced with PET textile | PET film (no adhesive) | PET double-sided acrylic adhesive tape |
| TC5 | Silica aerogel reinforced with PET textile | PET film (no adhesive) | PET double-sided acrylic adhesive tape |

Measured Attributes

Properties

| Component code | Loading of Aerogel (wt %) | Thermal Conductivity k (W/m · K) | Dielectric Constant, Dk | Loss Tangent, Df |
|---|---|---|---|---|
| TC1 | 55 | 0.016-0.022 | 1.34 | 0.128 |
| TC2 | 52 | 0.017-0.024 | 1.46 | 0.0151 |
| TC3 | 55 | 0.016-0.021 | 1.32-1.38 | 0.0124-0.0170 |
| TC4 | 20 | 0.024-0.033 | 1.6 | 0.0069 |
| TC5 | 48 | 0.019-0.023 | 1.4 | 0.007 |

Example 3

The following articles and comparative articles, which take the forms of thermal insulation layers, thermal insulation components, and combinations thereof, were constructed and tested. Components and constituent layers were tested for thermal conductivity and dielectric properties, and are described in Tables 2 and 3.

Article 1: (Article 1 is a thermal insulation layer designated as Component G1) A thermal insulation layer comprised of silica aerogel reinforced with PTFE was created per the teachings of U.S. Pat. No. 7,118,801 to Ristic-Lehmann et al. with a thickness of 0.25 mm. The loading of the aerogel in the composite was measured to be 55 wt %, according to "Thermogravimetric Analysis Method" (see, supra, "Test Methods"). The thermal conductivity of the composite was measured to be 0.017 W/m·K at 25° C. and 1 atm, when measured according to "Thermal Conductivity Test Method". The dielectric properties of the composite were measured according to "Dielectric Property Test Method", where the dielectric constant of the composite was measured to be 1.27 at 10 GHz and the loss tangent of the composite was measured to be 0.0164 at 10 GHz.

Article 2: (Article 2 is designated as Component H2) A thermal insulation layer comprised of silica aerogel reinforced with PTFE, with two ePTFE membranes bonded to both surfaces of the composite through temperature and pressure, was created per the teachings of U.S. Pat. No. 7,118,801 to Ristic-Lehmann et al. The ePTFE membranes were created per the teachings of U.S. Pat. No. 5,476,589 to Bacino, with both membranes having a mass per area of 0.5 g/m$^2$, air permeability of 3.4 Frazier, and thickness of 0.004 mm. The final thickness of the thermal insulation layer was 0.1 mm. The loading of the aerogel in this thermal insulation layer was measured to be 52 wt %, according to "Thermogravimetric Analysis Method". The thermal conductivity of the thermal insulation layer was measured to be 0.018 W/m·K at 25° C. and 1 atm, when measured according to "Thermal Conductivity Test Method". The dielectric properties of the thermal insulation layer were measured according to "Dielectric Property Test Method", where the dielectric constant was measured to be 1.32 at 10 GHz and the loss tangent was measured to be 0.0185 at 10 GHz.

Article 3: (A thermal insulation component designated as Component A1) The thermal insulation layer from Article 1 was used to construct a thermal insulation component with an adhesive layer and a protective film consisting of ePTFE. A 0.006 mm thick densified ePTFE film was created per the teachings of U.S. Pat. No. 7,521,010 to Kennedy et al. A PET double-sided acrylic adhesive tape of 0.005 mm thickness (part number 82600 Electronic Double Sided Tapes from 3M) was adhered to the 0.006 mm thick densified ePTFE film to create a protective film. This protective film was adhered to the 0.25 mm thick thermal insulation layer of Article 1 using light pressure applied with a hand roller. A PET double-sided acrylic adhesive tape of 0.01 mm thickness (part number SDK97C01 from Sidike New Materials Science and Technology Co., Ltd.) was adhered to the thermal insulation layer on the side facing away from the protective film. The adhesive was applied with light pressure using a hand roller. The thermal insulation component, consisting of a thermal insulation layer, a protective film, and an adhesive layer, had a thickness of 0.271 mm. The thermal conductivity of the thermal insulation component was measured to be 0.018 W/m·K at 25° C. and 1 atm, when measured according to "Thermal Conductivity Test Method". The dielectric properties of the thermal insulation component were measured according to "Dielectric Property Test Method", where the dielectric constant was measured to be 1.34 at 10 GHz and the loss tangent was measured to be 0.0128 at 10 GHz.

Article 4: (The thermal insulation component of Article 4 is designated as Components B1 and B2) The thermal insulation layer from Article 2 was used to construct a thermal insulation component with an adhesive layer and a protective film consisting of PET. A 0.01 mm thick PET single-sided acrylic adhesive (part number SDK7140 from Sidike New Materials Science and Technology Co., Ltd.) was used as a protective film and was adhered to the 0.1 mm thick thermal insulation layer from Article 2 using light pressure applied with a hand roller. A PET double-sided acrylic adhesive tape of 0.01 mm thickness (part number SDK97C01 from Sidike New Materials Science and Technology Co., Ltd.) was adhered to the thermal insulation layer on the side facing away from the protective film. The adhesive was applied with light pressure using a hand roller. The thermal insulation component, consisting of a thermal insulation layer, a protective film, and an adhesive layer, had a thickness of 0.12 mm. The thermal conductivity of the thermal insulation component was measured to be 0.021 W/m·K at 25° C. and 1 atm, when measured according to "Thermal Conductivity Test Method". The dielectric properties of the thermal insulation component was measured according to "Dielectric Property Test Method", where the dielectric constant was measured to be 1.52 at 10 GHz and the loss tangent was measured to be 0.0149 at 10 GHz.

Article 5: (The thermal insulation component of Article 5 is designated as Components C1 and C2) The thermal insulation layer from Article 1 was used to construct a thermal insulation component with an adhesive layer and a protective film consisting of PET. A 0.01 mm thick PET single-sided acrylic adhesive (part number SDK7140 from Sidike New Materials Science and Technology Co., Ltd.) was used as a protective film and was adhered to the 0.25 mm thick thermal insulation layer from Article 1 using light pressure applied with a hand roller. A PET double-sided acrylic adhesive tape of 0.01 mm thickness (part number SDK97C01 from Sidike New Materials Science and Technology Co., Ltd.) was adhered to the thermal insulation layer on the side facing away from the protective film. The adhesive was applied with light pressure using a hand roller. The thermal insulation component, consisting of a thermal insulation layer, a protective film, and an adhesive layer, had a thickness of 0.27 mm. The thermal conductivity of the thermal insulation component was measured to be 0.0185 W/m·K at 25° C. and 1 atm, when measured according to "Thermal Conductivity Test Method". The dielectric properties of the thermal insulation component were measured according to "Dielectric Property Test Method", where the dielectric constant was measured to be 1.38 at 10 GHz and the loss tangent was measured to be 0.017 at 10 GHz.

Article 6: (Th thermal insulation component is designated as Components D1 and D2) A thermal insulation layer comprised of silica aerogel reinforced with PTFE was created per the teachings of U.S. Pat. No. 7,118,801 to Ristic-Lehmann et al. with a thickness of 0.35 mm. The loading of the aerogel in the composite was measured to be 55 wt %, according to "Thermogravimetric Analysis Method". The thermal insulation layer was used to construct a thermal insulation component with an adhesive layer and a protective film consisting of PET.

A 0.01 mm thick PET single-sided acrylic adhesive (part number SDK7140 from Sidike New Materials Science and Technology Co., Ltd.) was used as a protective film and was adhered to the 0.35 mm thick thermal insulation layer using light pressure applied with a hand roller.

A PET double-sided acrylic adhesive tape of 0.01 mm thickness (part number SDK97C01 from Sidike New Materials Science and Technology Co., Ltd.) was adhered to the thermal insulation layer on the side facing away from the protective film. The adhesive was applied with light pressure using a hand roller.

The thermal insulation component, consisting of a thermal insulation layer, a protective film, and an adhesive layer, had a thickness of 0.37 mm. The thermal conductivity of the thermal insulation component was measured to be 0.0167 W/m·K at 25° C. and 1 atm, when measured according to "Thermal Conductivity Test Method". The dielectric properties of the thermal insulation component were measured according to "Dielectric Property Test Method", where the dielectric constant was measured to be 1.32 at 10 GHz and the loss tangent was measured to be 0.0124 at 10 GHz.

Article 7: (The thermal insulation component of Article 7 is designated as Component F1) A thermal insulation component produced by Panasonic consisting of silica aerogel reinforced by a PET non-woven textile (part number NASBIS® EYG-Y0912QN4S from Digi-Key® Electronics) was sourced. This part number is comprised of a 0.48 mm thick reinforced thermal insulation layer, 0.01 mm thick PET protective film (containing no adhesive) on one side of the thermal insulation layer, and a 0.01 mm thick double-sided acrylic adhesive on the side of the thermal insulation layer facing away from the protective film. The total thickness of the thermal insulation component is measured to be 0.5 mm. The loading of the aerogel in this thermal insulation component was measured to be 47.8 wt %, according to "Thermogravimetric Analysis Method". The thermal conductivity of the thermal insulation component was measured to be 0.020 W/m·K at 25° C. and 1 atm, when measured according to "Thermal Conductivity Test Method". The dielectric properties of the thermal insulation component were measured according to "Dielectric Property Test Method", where the dielectric constant was measured to be 1.4 at 10 GHz and the loss tangent was measured to be 0.007 at 10 GHz.

Comparative Example 1

Comparative Article 1: (The thermal insulation component of Comparative Article 1 is designated as Component E1) A thermal insulation component produced by Panasonic consisting of silica aerogel reinforced by a PET non-woven textile (part number NASBIS® EYG-Y0912QN6S from Digi-Key® Electronics) was sourced. This part number is comprised of the 0.1 mm thick reinforced thermal insulation layer, 0.01 mm thick PET protective film (containing no adhesive) on one side of the thermal insulation layer, and a 0.01 mm thick double-sided acrylic adhesive on the side of the thermal insulation layer facing away from the protective film. The total thickness of the thermal insulation component is measured to be 0.12 mm. The loading of the aerogel in this thermal insulation component was measured to be 20.1 wt %, according to "Thermogravimetric Analysis Method"

(see, supra, "Test Methods"). The thermal conductivity of the thermal insulation component was measured to be 0.028 W/m·K at 25° C. and 1 atm, when measured according to "Thermal Conductivity Test Method". The dielectric properties of the thermal insulation component were measured according to "Dielectric Property Test Method", where the dielectric constant was measured to be 1.6 at 10 GHz and the loss tangent was measured to be 0.009 at 10 GHz Comparative Article 2: (This thermal insulation layer is designated as Component I1) A thermal insulation layer produced by Shenzhen Shenzen Dianzi Keji ("Sheen Electronics") consisting of a silica aerogel reinforced with a PET carrier film (part number SY300N) was sourced. This part number is comprised of a 0.03 mm PET carrier film with a 0.075 mm coating of aerogel on one side of the PET carrier film. The thickness of the thermal insulation layer was measured to be 0.105 mm. The loading of the aerogel in this thermal insulation layer was measured to be 22.5 wt %, according to "Thermogravimetric Analysis Method". The thermal conductivity of the thermal insulation layer was measured to be 0.033 W/m·K at 25° C. and 1 atm, when measured according to "Thermal Conductivity Test Method". The dielectric properties of the thermal insulation layer were measured according to "Dielectric Property Test Method", where the dielectric constant was measured to be 1.64 at 10 GHz and the loss tangent was measured to be 0.011 at 10 GHz.

Example 4

TABLE 4

Model Inputs — Measured Components

| Example Code Measured Components | Component Construction | | |
|---|---|---|---|
| | Thermal Insulation Layer | Protective Film | Adhesive Layer |
| A1* | Silica aerogel reinforced with PTFE | ePTFE Film + Adhesive | Acrylic Adhesive |
| B1* | Silica aerogel reinforced with PTFE, clad with ePTFE membranes | PET Film + Adhesive | Acrylic Adhesive |
| C1* | Silica aerogel reinforced with PTFE | PET Film + Adhesive | Acrylic Adhesive |
| D1* | Silica aerogel reinforced with PTFE | PET Film + Adhesive | Acrylic Adhesive |
| E1* | Silica aerogel reinforced with PET Textile | PET Film | Acrylic Adhesive |
| F1* | Silica aerogel reinforced with PET Textile | PET Film | Acrylic Adhesive |

| Example Code Measured Components | Thickness | | Properties | | |
|---|---|---|---|---|---|
| | Total Component Thickness (mm) | % Insulation Layer % Protective Film % Adhesive Layer | Component Dk | Component Df | Component k (W/m · K) |
| A1* | 0.271 | 92.2 / 3.9 / 3.9 | 1.34 | 0.0128 | 0.0184 |
| B1* | 0.12 | 83.4 / 8.3 / 8.3 | 1.52 | 0.0149 | 0.0214 |
| C1* | 0.27 | 92.6 / 3.7 / 3.7 | 1.38 | 0.017 | 0.0185 |
| D1* | 0.37 | 94.6 / 2.7 / 2.7 | 1.32 | 0.0124 | 0.018 |
| E1* | 0.12 | 83.4 / 8.3 / 8.3 | 1.6 | 0.009 | 0.028 |
| F1* | 0.5 | 96 / 2 / 2 | 1.4 | 0.007 | 0.02 |

Herein and hereinafter "*" indicates that the exact sample construction has been tested for dielectric and thermal properties.

The thermal insulation components displayed in Table 4 were physically constructed and tested per the "Thermal Conductivity Test Method" and "Dielectric Property Test Method" (see, supra, Test Methods). The measured parameters were input into the model shown in FIG. 9 to determine if the components pass or fail the RF transmission loss requirement. No thermal conductivity calculation was required since thermal conductivity was measured on the thermal insulation components.

The constituent layers of Components B1, C1, and D1, were individually tested per "Thermal Conductivity Test Method" and "Dielectric Property Test Method." Table 5 displays Components B2, C2, and D2, which are virtual constructions of B1, C1, and D1, respectively, by using the measured attributes of constituent layers and principles of series impedance. The measured parameters were input into the models depicted in FIGS. 8 and 9 to determine if the components: 1) pass or fail thermal conductivity and RF transmission loss requirements, and 2) match closely with their component counterpart (B2 compared to B1, etc.). Results for components A1, B1, B2, C1, C2, D1, D2, E1, and F1 are displayed in Table 6.

TABLE 5

Model Inputs — Select Measured Components by Constituent Layer

| Sample Code Virtual Component Constructions (from Measured Constituent Layers) | Component Construction | | | Thickness Total Component (mm) | % Composition Insulation Layer Protective Film Adhesive Layer |
|---|---|---|---|---|---|
| | Thermal Insulation Layer | Protective Film | Adhesive Layer | | |
| B2 | Silica aerogel reinforced with PTFE, clad with ePTFE membranes | PET Film + Adhesive | Acrylic Adhesive | 0.12 | 83.4 8.3 8.3 |
| C2 | Silica aerogek reinforced with PTFE | PET Film + Adhesive | Acrylic Adhesive | 0.27 | 92.6 3.7 3.7 |
| D2 | Silica aerogel reinforced with PTFE | PET Film + Adhesive | Acrylic Adhesive | 0.37 | 94.6 2.7 2.7 |

| Sample Code Virtual Component Constructions (from Measured Constituent Layers) | Properties | | |
|---|---|---|---|
| | Dk Thermal Insulation Layer Protective Film Adhesive Layer | Df Thermal Insulation Layer Protective Film Adhesive Layer | k (W/m · k) Thermal Insulation Layer Protective Film Adhesive Layer |
| B2 | 1.32 | 0.0185 | 0.018 |
| | 2.74 | 0.0167 | 0.19 |
| | 2.44 | 0.014 | 0.19 |
| C2 | 1.28 | 0.0176 | 0.017 |
| | 2.74 | 0.0167 | 0.19 |
| | 2.44 | 0.014 | 0.19 |
| D2 | 1.23 | 0.0122 | 0.017 |
| | 2.74 | 0.0167 | 0.19 |
| | 2.44 | 0.014 | 0.19 |

TABLE 6

Thermal and RF Outputs (Pass/Fail) for Components A-F

| Sample code | Thermal Conductivity (W/m · K) | | RF Transmission Loss (dB) | | | |
|---|---|---|---|---|---|---|
| | Component Conductivity | P/F (<0.025 W/m · K) | @ 28 GHz | P/F (<0.25 dB) | @ 39 GHz | P/F (<0.25 dB) |
| A1* | 0.0184 | P | 0.0149 | P | 0.0224 | P |
| B1* | 0.0214 | P | 0.0084 | P | 0.0124 | P |
| B2 | 0.0212 | P | 0.0098 | P | 0.0144 | P |
| C1* | 0.0185 | P | 0.02 | P | 0.0297 | P |
| C2 | 0.0182 | P | 0.0201 | P | 0.0299 | P |
| D1* | 0.018 | P | 0.0205 | P | 0.031 | P |
| D2 | 0.0179 | P | 0.0199 | P | 0.0298 | P |
| E1* | 0.028 | F | 0.0063 | P | 0.0099 | P |
| F1* | 0.02 | P | 0.0266 | P | 0.0436 | P |

All tested sample constructions pass the requirements except for Component E1. Component E1 failed the thermal conductivity specification of <0.025 W/m·K at 25° C. and 1 atm. As was shown in Table 2, this thermal component has an aerogel loading of 20 wt %, illustrating that, in some embodiments, a low loading of aerogel content in the thermal insulation component will result in higher than desired thermal conductivity. In the tested components with a low loading of aerogel, the resulting component conductivity is greater than that of air, leading to an ineffective thermal barrier as compared to air. The other components that pass the thermal conductivity requirement have aerogel loadings of 48-55 wt %, demonstrating that, in some embodiments, the design of the thermal insulation layer is critical to ensuring a thermal conductivity below that of air.

The thermal conductivity and RF transmission loss results for Components B2, C2, and D2, matched very closely to their counterparts B1, C1, and D1, respectively. These results validate the approach of using virtual constructions of thermal insulation components from constituent layers with given properties. In some of the following examples, this approach will be used to build constructions that are thicker than physical samples tested in the "Thermal Conductivity Test Method" and "Dielectric Property Test Method."

Example 5

TABLE 7

Model Inputs — Virtual Constructions Two-Layer Components

| Sample Code Virtual Constructions for Two-Layer Components | Component Construction | |
|---|---|---|
| | Thermal Insulation Layer | Protective Film |
| G | Silica aerogel reinforced with PTFE | None |
| H | Silica aerogel reinforced with PTFE, clad with ePTFE membranes | None |
| I | Silica aerogel coating reinforced with PET carrier film | None |
| J | Silica aerogel reinforced with PTFE | ePTFE Film |
| K | Silica aerogel reinforced with PTFE clad with | PET Film |

TABLE 7-continued

Model Inputs — Virtual Constructions Two-Layer Components

| Sample Code Virtual Constructions for Two-Layer Components | ePTFE membranes | | |
|---|---|---|---|
| | Properties | | |
| | Dk Thermal Insulation Layer Protective Film | Df Thermal Insulation Layer Protective Film | k (W/m · k) Thermal Insulation Layer Protective Film |
| G | 1.27 | 0.0164 | 0.017 |
| | N/A | N/A | N/A |
| H | 1.32 | 0.0185 | 0.018 |
| | N/A | N/A | N/A |
| I | 1.64 | 0.011 | 0.033 |
| | N/A | N/A | N/A |
| J | 1.32 | 0.0203 | 0.015 |
| | 1.4 | 0.0001 | 0.06 |
| K | 1.36 | 0.022 | 0.02 |
| | 2.75 | 0.023 | 0.19 |

Table 7 describes Components G, H, K, I, J, and K which are virtual component constructions built from constituent layers with measured properties, independent of thickness. All components comprise a thermal insulation layer, and Components J and K additionally comprise a protective film. Additional adhesive layers are omitted in order to simplify the following samples.

TABLE 8

Thermal and RF Outputs (Pass/Fail) for Components G-K

| | Thickness Inputs | | | Thermal Conductivity (W/m · K) | |
|---|---|---|---|---|---|
| Sample | Total Component Thickness (mm) | % Insulation | % Protective Film | Component Conductivity | P/F (<0.025 W/m · K) |
| G1* | 0.25 | 100 | 0 | 0.017 | P |
| G2 | 2 | 100 | 0 | 0.017 | P |
| H1 | 0.03 | 100 | 0 | 0.018 | P |
| H2* | 0.1 | 100 | 0 | 0.018 | P |
| H3 | 2 | 100 | 0 | 0.018 | P |
| I1* | 0.12 | 100 | 0 | 0.033 | P |
| I2 | 2 | 100 | 0 | 0.033 | P |
| J1 | 0.5 | 50 | 50 | 0.024 | P |
| J2 | 2 | 50 | 50 | 0.024 | P |
| J3 | 2 | 80 | 20 | 0.0176 | P |
| J4 | 2 | 98 | 2 | 0.0152 | P |
| K1 | 0.5 | 50 | 50 | 0.0362 | F |
| K2 | 1 | 50 | 50 | 0.0362 | F |
| K3 | 1 | 80 | 20 | 0.0244 | P |
| K4 | 2 | 80 | 20 | 0.0244 | P |
| K5 | 1 | 98 | 2 | 0.0204 | P |
| K6 | 2 | 98 | 2 | 0.0204 | P |

| | RF Transmission Loss (dB) | | | |
|---|---|---|---|---|
| Sample | @ 28 GHz | P/F (<0.25 dB) | @ 39 GHz | P/F (<0.25 dB) |
| G1* | 0.0149 | P | 0.0216 | P |
| G2 | 0.1536 | P | 0.1856 | P |
| H1 | 0.0019 | P | 0.0027 | P |
| H2* | 0.0066 | P | 0.0094 | P |
| H3 | 0.1889 | P | 0.2223 | P |
| I1* | 0.0077 | P | 0.0119 | P |
| I2 | 0.3323 | F | 0.2926 | F |
| J1 | 0.0286 | P | 0.045 | P |
| J2 | 0.158 | P | 0.172 | P |
| J3 | 0.18 | P | 0.2037 | P |
| J4 | 0.1973 | P | 0.2327 | P |

TABLE 8-continued

Thermal and RF Outputs (Pass/Fail) for Components G-K

| | | | | |
|---|---|---|---|---|
| K1 | 0.1549 | P | 0.2569 | P |
| K2 | 0.4358 | F | 0.6631 | F |
| K3 | 0.2077 | P | 0.3064 | P |
| K4 | 0.4071 | F | 0.4295 | F |
| K5 | 0.1204 | P | 0.1744 | P |
| K6 | 0.2368 | P | 0.263 | P |

Sample components G1, G2, H1, H2, and H3 exhibit aerogel loadings of 52-55 wt %, yielding k: <0.02 W/m·K, which passes the thermal conductivity criteria (k<0.025 W/m·K). The low Dk (<1.5) and moderate Df (<0.03 & >0.01) of these components enable RF transmission loss <0.25 dB at 28 and 39 GHz, which passes for the RF transmission loss criteria for all examples constructions up to 2 mm.

Components I1 and I2 exhibit aerogel loadings of 22.5 wt %, yielding k>0.025, which fails the thermal conductivity criteria (k<0.025 W/m·K). The moderate Dk (<2.0) and moderate Df (<0.03) of these components enable RF transmission loss <0.25 dB at 28 and 39 GHz for relatively thin samples (<~0.5 mm), and RF transmission loss >0.25 dB at 28 and 39 GHz for thicker samples (>~0.5 mm) up to 2 mm. Therefore, Example I1 (0.12 mm) passes the RF transmission loss criteria and I2 (2 mm) fails the RF transmission loss criteria.

Components J and K are constructed with similar thermal insulation layers and different protective films. While PET is a commodity and PET protective films may have advantages in cost, ePTFE protective films have relative advantages in low k (0.06 W/m·K), low Dk (<1.5), and very low Df (<0.001). Comparatively, the PET protective film has moderate k (<0.4 W/m·K), moderately high Dk (<3.0), and moderate Df (<0.03).

The thermal insulation layers for Components J1, J2, J3, and J4 exhibit aerogel loadings of ~55 wt %. When bonded to an ePTFE protective film, the thermal conductivity of the thermal insulation component is <0.025 W/m·K for all example constructions >50% insulation by thickness. These components enable RF transmission loss <0.25 dB at 28 and 39 GHz, which passes for the RF transmission loss criteria for all examples constructions up to 2 mm.

Figures 11A, 11B:
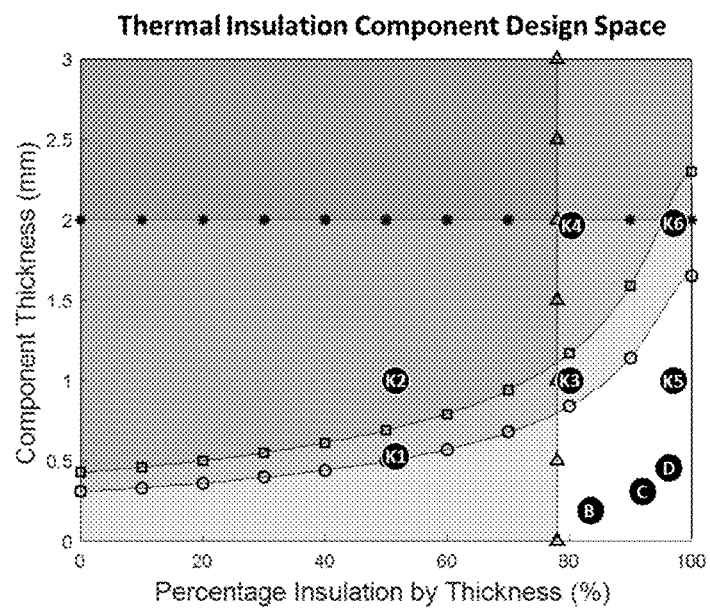
FIGS. 11A to 11B illustrate additional exemplary design spaces for some non-limiting assemblies of the present disclosure.

The thermal insulation layers for Components K1, K2, K3, K4, K5, and K6 exhibit aerogel loadings of 52 wt %. When bonded to a PET protective film, the thermal conductivity of thermal insulation component is <0.025 W/m·K for all example constructions >80% insulation by thickness. These components enable RF transmission loss <0.25 dB at 28 and 39 GHz at specific combinations of component thickness and % insulation by thickness. It can also be noted that some example constructions may meet the RF transmission loss criteria at 28 GHz, but not at 39 GHz, such as Components K1, K3, and K6. The design space for Thermal Insulation Component K is shown in the graph of FIG. 11A, with FIG. 11B being a key for FIG. 11A. Sample components K1, K2, K3, K4, K5, and K6 are tagged on the graph for reference of passing and failing samples by design requirement (Table 8). Components B, C, and D are shown in FIG. 11A for reference since the constituent materials and properties are similar to that of Component K.

Example 6

TABLE 9

Model Inputs — Virtual Component Constructions Exhibiting Dielectric Limits

| Sample Code Virtual Constructions for Components Exhibiting Dielectric Limits | Component Construction | |
|---|---|---|
| | Thermal Insulation Layer | Protective Film |
| L | Reinforced Aerogel | ePTFE Film |
| M | Reinforced Aerogel | ePTFE Film |

| | Properties | | |
|---|---|---|---|
| Sample Code Virtual Constructions for Components Exhibiting Dielectric Limits | Dk Thermal Insulation Layer Protective Film | Df Thermal Insulation Layer Protective Film | k (W/m · K) Thermal Insulation Layer Protective Film |
| L | 4 | 0.01 | 0.017 |
| | 1.4 | 0.0001 | 0.06 |
| M | 1.2 | 0.1 | 0.017 |
| | 1.4 | 0.0001 | 0.06 |

Table 9 displays two thermal insulation components that test the dielectric limits of the thermal insulation layer on the thermal insulation component design space. ePTFE is the protective film in this exercise due to its low dielectric properties. The thermal insulation layer of Component L was chosen to exhibit an upper limit of Dk(4.0) and the thermal insulation layer of Component M was chosen to exhibit an upper limit of Df(0.1).

TABLE 10

Thermal and RF Outputs (Pass/Fail) Components L-M

| | Thickness Inputs | | | Thermal Conductivity (W/m · K) | |
|---|---|---|---|---|---|
| Sample | Total Component Thickness (mm) | % Insulation | % Protective Film | Component Conductivity | P/F (<0.025 W/m · K) |
| L1 | 0.04 | 80 | 20 | 0.0198 | P |
| L2 | 0.73 | 80 | 20 | 0.0198 | P |
| M1 | 0.04 | 80 | 20 | 0.0198 | P |
| M2 | 0.7 | 80 | 20 | 0.0198 | P |

| | RF Transmission Loss (dB) | | | |
|---|---|---|---|---|
| Sample | @ 28 GHz | P/F (<0.25 dB) | @ 39 GHz | P/F (<0.25 dB) |
| L1 | 0.0069 | P | 0.0117 | P |
| L2 | 0.136 | P | 0.2467 | P |
| M1 | 0.0098 | P | 0.0137 | P |
| M2 | 0.1769 | P | 0.2465 | P |

Four samples were tested using the Material Properties from Table 9. Results are displayed in Table 10. Samples L1 and M1 show that thin versions of these components are suitable in the design space. Samples L2 and M2 were constructed to find the max thickness (80% insulation by thickness) such that the component passes all criteria for Thermal and RF. For L2 and M2, the component thickness limits were found to be 0.23 mm and 0.7 mm, respectively. These results exemplify the tradeoffs between thickness and dielectric properties of the thermal insulation layer. The results also demonstrate that the dielectric constant of the thermal insulation layer may be more sensitive to changes in thickness than the loss tangent of the thermal insulation layer.

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. An assembly comprising:
   at least one antenna,
      wherein the at least one antenna is configured to transmit a field of radiofrequency (RF) communication at an operating frequency ranging from 6 GHz to 100 GHz; and
   a thermal insulation component,
      wherein the thermal insulation component comprises:
         a thermal insulation layer;
         a protective film, wherein the protective film comprises:
            a polymer layer; and
            a first adhesive layer, wherein the first adhesive layer is disposed between the thermal insulation layer and the polymer layer; and
         a second adhesive layer;
            wherein the thermal insulation layer is disposed between the protective film and the second adhesive layer; and
            wherein the second adhesive layer is disposed between the thermal insulation layer and the at least one antenna;
      wherein the thermal insulation component is disposed within the field of RF communication, and
      wherein the thermal insulation component has a thermal conductivity of 0.0025 W/m·K to 0.025 W/m·K at 25° C. and 1 atm.

2. The assembly of claim 1, wherein the thermal insulation component has a thickness of 0.03 mm to 2 mm.

3. The assembly of claim 1, wherein the thermal insulation component comprises an aerogel.

4. The assembly of claim 3, wherein the thermal insulation component comprises the aerogel in an amount of at least 30 wt % based on a total weight of the thermal insulation component.

5. The assembly of claim 4, wherein the thermal insulation component comprises the aerogel in an amount of 30 wt % to 95 wt % based on a total weight of the thermal insulation component.

6. The assembly of claim 3, wherein the thermal insulation component further comprises polytetrafluoroethylene (PTFE).

7. The assembly of claim 6, wherein the aerogel is a PTFE reinforced aerogel.

8. The assembly of claim 7, wherein the PTFE reinforced aerogel is a PTFE reinforced aerogel in a clad configuration, wherein the clad configuration comprises a plurality of ePTFE layers, wherein each of the plurality of ePTFE layers is bonded to a surface of the thermal insulation layer.

9. The assembly of claim 1, wherein the thermal insulation component comprises a plurality of thermal insulation layers.

10. The assembly of claim 1, wherein the at least one antenna is in the form of an antenna array, wherein the antenna array comprises a plurality of antennas, wherein each antenna is configured to transmit the field of RF communication at the operating frequency ranging from 6 GHz to 100 GHz.

11. The assembly of claim 10, wherein the thermal insulation component is embedded within the antenna array.

12. The assembly of claim 1, wherein the thermal insulation component has a dielectric constant ranging from 1.05 to 4 measured in accordance with IEC 61189-2-721 Edition 12015-04 at 10 GHz using a Split Post Dielectric Resonator (SPDR).

13. The assembly of claim 1, wherein the thermal insulation has a loss tangent ranging from 0.00001 to 0.1 measured in accordance with IEC 61189-2-721 Edition 12015-04 at 10 GHz using a Split Post Dielectric Resonator (SPDR).

14. The assembly of claim 1, wherein the assembly is within an enclosure of a device.

15. The assembly of claim 1, wherein a portion of the thermal insulation component extends beyond the field of RF communication.

16. The assembly of claim 1, wherein the assembly further comprises a power amplifier.

17. The assembly of claim 1, wherein the assembly has an operating temperature ranging from 20° C. to 120° C., wherein the operating temperature is measured at an interface between the thermal insulation component and the at least one antenna.

18. An assembly comprising:
   at least one antenna,
      wherein the at least one antenna is configured to transmit a field of radiofrequency (RF) communication at an operating frequency ranging from 6 GHz to 100 GHz; and
   a thermal insulation component,
      wherein the thermal insulation component comprises:
         a thermal insulation layer;

a protective film, wherein the protective film comprises:
a polymer layer; and
a first adhesive layer, wherein the first adhesive layer is disposed between the thermal insulation layer and the polymer layer; and
a second adhesive layer
wherein the thermal insulation layer is disposed between the protective film and the second adhesive layer; and
wherein the second adhesive layer is disposed between the thermal insulation layer and the at least one antenna;
wherein the thermal insulation component is disposed within the field of RF communication, and
wherein the thermal insulation component has a thermal conductivity ranging from 0.0025 W/m·K to 0.025 W/m·K at 25° C. and 1 atm,
wherein the thermal insulation component has a has a dielectric constant ranging from 1.05 to 4 measured in accordance with IEC 61189-2-721 Edition 1 2015-04 at 10 GHz using a Split Post Dielectric Resonator (SPDR), and
wherein the thermal insulation component has a loss tangent ranging from 0.00001 to 0.1 measured in accordance with IEC 61189-2-721 Edition 1 2015-04 at 10 GHz using the SPDR.

19. An assembly comprising:
at least one antenna,
wherein the at least one antenna is configured to transmit a field of radiofrequency (RF) communication at an operating frequency ranging from 6 GHz to 100 GHz; and
a thermal insulation component,
wherein the thermal insulation component comprises:
a thermal insulation layer;
a protective film, wherein the protective film comprises:
a polymer layer; and
a first adhesive layer, wherein the first adhesive layer is disposed between the thermal insulation layer and the polymer layer; and
a second adhesive layer;
wherein the thermal insulation layer is disposed between the protective film and the second adhesive layer; and
wherein the second adhesive layer is disposed between the thermal insulation layer and the at least one antenna;
wherein the thermal insulation component is disposed within the field of RF communication,
wherein the thermal insulation component has a thickness of 0.03 mm to 2 mm, and
wherein the thermal insulation component comprises an aerogel in an amount of 30 wt % to 95 wt % based on a total weight of the thermal insulation component.

20. The assembly of claim 19, wherein the thermal insulation component has a thermal conductivity ranging from 0.0025 W/m·K to 0.025 W/m·K at 25° C. and 1 atm.

21. An assembly comprising:
an antenna array,
wherein the antenna array is configured to transmit a field of radiofrequency (RF) communication at an operating frequency ranging from 6 GHz to 100 GHz; and
a thermal insulation component,
wherein the thermal insulation component is disposed within the field of RF communication, and wherein the thermal insulation component comprises:
a thermal insulation layer;
wherein the thermal insulation layer defines 50% to 99% of a total thickness of the thermal insulation component;
a protective film, wherein the protective film comprises:
a polymer layer; and
a first adhesive layer, wherein the first adhesive layer is disposed between the thermal insulation layer and the polymer layer; and
a second adhesive layer,
wherein the thermal insulation layer is disposed between the protective film and the second adhesive layer; and
wherein the second adhesive layer is disposed between the antenna array and the thermal insulation layer.

22. The assembly of claim 21, wherein the at least one thermal insulation layer has a thermal conductivity ranging from 0.0025 W/m·K to 0.025 W/m·K at 25° C. and 1 atm.

* * * * *